(12) United States Patent
Sugiyama et al.

(10) Patent No.: US 11,541,347 B2
(45) Date of Patent: Jan. 3, 2023

(54) DISPLAY DEVICE OF VEHICLE ON WHICH $CO_2$ RECOVERY DEVICE IS MOUNTED

(71) Applicant: TOYOTA JIDOSHA KABUSHIKI KAISHA, Toyota (JP)

(72) Inventors: Kouseki Sugiyama, Sunto-gun (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 16/987,774

(22) Filed: Aug. 7, 2020

(65) Prior Publication Data
US 2021/0093992 A1    Apr. 1, 2021

(30) Foreign Application Priority Data

Sep. 27, 2019   (JP) .............................. JP2019-177575

(51) Int. Cl.
     *B01D 53/02*      (2006.01)
     *B01D 53/04*      (2006.01)
     *B60K 35/00*      (2006.01)

(52) U.S. Cl.
CPC ..... *B01D 53/0454* (2013.01); *B01D 53/0438* (2013.01); *B60K 35/00* (2013.01);
(Continued)

(58) Field of Classification Search
CPC ............ B01D 53/0454; B01D 53/0438; B01D 2253/102; B01D 2253/108; B01D 2257/504; B01D 2259/40088; B01D 2259/4566; B01D 2259/655; B60K 2370/152; B60K 2370/178; B60K 2370/171; B60K 2370/20
See application file for complete search history.

(56) References Cited

U.S. PATENT DOCUMENTS

2009/0082952 A1*   3/2009   Narita ................ G01C 21/3469
                                                                                                    701/533
2010/0217535 A1*   8/2010   Seidel .................... G06Q 50/06
                                                                                                    73/23.31

(Continued)

FOREIGN PATENT DOCUMENTS

JP         2014-509360 A     4/2014
WO     WO 2012/1001 49 A1     7/2012

*Primary Examiner* — Christopher P Jones
(74) *Attorney, Agent, or Firm* — Oblon, McClelland, Maier & Neustadt, L.L.P.

(57) ABSTRACT

A display device of a vehicle on which a $CO_2$ recovery device is mounted, the $CO_2$ recovery device through which gas circulates recovering carbon dioxide from the gas, the display device includes: a controller configured to control the vehicle, the controller including a recovery state determination unit configured to determine a recovery amount or a recovery state of the carbon dioxide recovered by the $CO_2$ recovery device and an image data creation unit configured to create image data corresponding to the recovery amount or the recovery state detected by the recovery state determination unit; and a display screen configured to receive the image data and display an image corresponding to the image data, wherein the image data and the image vary depending on the recovery amount or the recovery state.

15 Claims, 20 Drawing Sheets

(52) U.S. Cl.
CPC .. *B01D 2253/102* (2013.01); *B01D 2253/108* (2013.01); *B01D 2257/504* (2013.01); *B01D 2259/40088* (2013.01); *B01D 2259/4566* (2013.01); *B01D 2259/655* (2013.01); *B60K 2370/152* (2019.05); *B60K 2370/171* (2019.05); *B60K 2370/178* (2019.05); *B60K 2370/20* (2019.05)

(56) References Cited

U.S. PATENT DOCUMENTS

| | | | |
|---|---|---|---|
| 2014/0182267 A1 | 7/2014 | Hyde et al. | |
| 2014/0229255 A1* | 8/2014 | Scofield | G06Q 30/0207 |
| | | | 705/14.1 |
| 2017/0030234 A1* | 2/2017 | Hyde | B01D 53/94 |
| 2020/0402072 A1* | 12/2020 | Sugiyama | B01D 53/047 |
| 2021/0001266 A1* | 1/2021 | Sugiyama | H04W 4/48 |

* cited by examiner

TOTAL MILEAGE 10,000km

TOTAL DISCHARGE AMOUNT OF $CO_2$

700kg

TOTAL RECOVERY AMOUNT OF $CO_2$

350kg

DISPLAY DEVICE OF VEHICLE ON WHICH $CO_2$ RECOVERY DEVICE IS MOUNTED

CROSS-REFERENCE TO RELATED APPLICATION

This application claims priority to Japanese Patent Application No. 2019-177575 filed on Sep. 27, 2019, incorporated herein by reference in its entirety.

BACKGROUND

1. Technical Field

The present disclosure relates to a display device of a vehicle on which a $CO_2$ recovery device is mounted.

2. Description of Related Art

A vehicle on which a $CO_2$ recovery device is mounted is described in Japanese Unexamined Patent Application Publication No. 2014-509360 (JP 2014-509360 A). The $CO_2$ recovery device described in JP 2014-509360 A is configured to reduce the carbon dioxide in exhaust gas by supplying the exhaust gas (exhaust stream) discharged from an engine to a $CO_2$ capturing agent and extracting the carbon dioxide in the exhaust gas from the exhaust gas using the $CO_2$ capturing agent. After contacting the capturing agent, the exhaust gas is discharged into the atmosphere. Further, in the device described in JP 2014-509360 A, carbon dioxide is desorbed from the capturing agent by heating the capturing agent using exhaust heat from the engine, the desorbed carbon dioxide is compressed and liquefied, and then the carbon dioxide is temporarily reserved in the vehicle in this state.

SUMMARY

Since a vehicle on which a $CO_2$ recovery device is mounted can reduce an increase of carbon dioxide in the atmosphere, the vehicle can greatly contribute to reduction or prevention of global warming. Therefore, it is desirable that a vehicle on which a $CO_2$ recovery device is mounted should be more actively used or driven than a vehicle without a $CO_2$ recovery device. However, in the configuration of JP 2014-509360 A, although carbon dioxide can be automatically recovered, the degree or situation of the recovery cannot be obtained by an occupant or user of the vehicle, and thus it is not sufficient in increasing awareness of the recovery of carbon dioxide. For this reason, an occupant or user has not been motivated to promote the use of a vehicle on which a $CO_2$ recovery device is mounted, and thus, there is room for developing a new technology.

The present disclosure provides a display device that can promote the use of a vehicle on which a $CO_2$ recovery device is mounted and reduce a discharge amount of carbon dioxide in the atmosphere.

A display device according to an aspect of the present disclosure is a display device of a vehicle on which a $CO_2$ recovery device is mounted. The $CO_2$ recovery device through which gas circulates recovers carbon dioxide from the gas. The display device includes a controller that controls the vehicle and includes a recovery state determination unit configured to determine a recovery amount or a recovery state of the carbon dioxide recovered by the $CO_2$ recovery device and an image data creation unit configured to create image data corresponding to the recovery amount or the recovery state detected by the recovery state determination unit, and a display screen that receives the image data and displays an image corresponding to the image data. The image data and the image vary depending on the recovery amount or the recovery state.

In the aspect of the present disclosure, the $CO_2$ recovery device may include an adsorption unit configured to capture the carbon dioxide from the gas and adsorb the carbon dioxide. The controller may be configured to: determine whether an adsorption amount of the carbon dioxide adsorbed in the adsorption unit has reached a limit value; and output, to the display screen, when determining that the adsorption amount has reached the limit value, a warning display from which a fact that the adsorption amount has reached the limit value is recognizable as an image data corresponding to the adsorption unit.

In the aspect of the present disclosure, the controller may be configured to, when determining that the adsorption amount has not reached the limit value: determine whether the adsorption amount is equal to or greater than a predetermined threshold value which is smaller than the limit value; and output, to the display screen, when determining that the adsorption amount is equal to or greater than the predetermined threshold value, a second warning display having a degree of caution which is lower than that of the warning display.

In the aspect of the present disclosure, the controller may be configured to: determine whether the $CO_2$ recovery device is recovering the carbon dioxide; determine, when determining that the $CO_2$ recovery device is recovering the carbon dioxide, whether a source from which the carbon dioxide is recovered is one of an exhaust system of the vehicle, atmosphere outside the vehicle, or air inside a cabin of the vehicle; output, to the display screen, when determining that the source is the exhaust system, a display indicating that the carbon dioxide is being recovered from the exhaust system; output, to the display screen, when determining that the source is the atmosphere, a display indicating that the carbon dioxide is being recovered from the atmosphere; and output, to the display screen, when determining that the source is the air inside the cabin of the vehicle, a display indicating that the carbon dioxide is being recovered from the air.

In the aspect of the present disclosure, the controller may be configured to: determine, when the carbon dioxide has been recovered from the exhaust system, whether all of the carbon dioxide contained in the exhaust system has been recovered; and output, to the display screen, when determining that all of the carbon dioxide contained in the exhaust system has been recovered, a mark representing environmental conservation.

In the aspect of the present disclosure, the controller may be configured to output, to the display screen, when determining that the carbon dioxide has been recovered from the atmosphere or from the air, a mark representing environmental conservation.

In the aspect of the present disclosure, the controller may be configured to: determine, when determining that the $CO_2$ recovery device is not recovering the carbon dioxide, whether the carbon dioxide is being extracted to recovery equipment provided outside the vehicle; and output, to the display screen, when determining that the carbon dioxide is being extracted to the recovery equipment, a display indicating that the carbon dioxide is being extracted.

In the aspect of the present disclosure, the controller may be configured to: determine whether the carbon dioxide is being extracted to the recovery equipment by using energy from the vehicle or energy from outside of the vehicle; output, to the display screen, when determining that the carbon dioxide is being extracted to the recovery equipment by using the energy from the vehicle, a display indicating that the energy from the vehicle is being supplied to the $CO_2$ recovery device; and output, to the display screen, when determining that the carbon dioxide is being extracted to the recovery equipment by using the energy from the outside of the vehicle, a display indicating that the energy from the outside of the vehicle is being supplied to the $CO_2$ recovery device.

In the aspect of the present disclosure, the controller may be configured to output a mark representing environmental conservation to the display screen when determining that the carbon dioxide has been extracted to the recovery equipment.

In the aspect of the present disclosure, the controller may be configured to: calculate total mileage of the vehicle which is a predetermined section, and a total recovery amount which is an amount of carbon dioxide recovered while the vehicle travels the total mileage; calculate a total recovery rate of the carbon dioxide which is a rate of a recovery amount of the carbon dioxide to mileage, from the total mileage and the total recovery amount; and output the total recovery rate to the display screen.

In the aspect of the present disclosure, the controller may be configured to: calculate a total discharge amount of carbon dioxide which is an amount of the carbon dioxide discharged while the vehicle travels the total mileage; calculate a total discharge rate of the carbon dioxide which is a rate of a discharge amount of the carbon dioxide to the mileage, from the total discharge amount and the total mileage; calculate an actual discharge rate of the carbon dioxide which is an actual discharge rate of the carbon dioxide, from the total discharge rate and the total recovery rate; and output the actual discharge rate to the display screen.

In the aspect of the present disclosure, the controller may be configured to: calculate section mileage of the vehicle, which is mileage of a predetermined section, and a section recovery amount which is an amount of carbon dioxide recovered while the vehicle travels the section mileage; calculate a section recovery rate of the carbon dioxide which is a rate of a recovery amount of the carbon dioxide to mileage, from the section mileage and the section recovery amount; and output the section recovery rate to the display screen.

In the aspect of the present disclosure, the controller may be configured to: calculate a section discharge amount of carbon dioxide which is an amount of carbon dioxide discharged while the vehicle travels the section mileage; calculate a section discharge rate of the carbon dioxide which is a rate of a discharge amount of carbon dioxide to the mileage, from the section discharge amount and the section mileage; calculate an actual section discharge rate which is an actual discharge rate of the carbon dioxide in the section mileage, from the section recovery rate and the section discharge rate; and output the actual section discharge rate to the display screen.

In the aspect of the present disclosure, the controller may be configured to: determine whether the actual section discharge rate is zero; and output, to the display screen, when determining that the actual section discharge rate is zero, a display indicating that a discharge amount of the carbon dioxide is zero.

In the aspect of the present disclosure, the controller may be configured to determine, when determining that the actual section discharge rate is not zero, whether the actual section discharge rate is minus; and output, to the display screen, when determining that the actual section discharge rate is minus, a display indicating that a discharge amount of the carbon dioxide is minus.

In the above aspect of the present disclosure, by using or driving the vehicle on which the $CO_2$ recovery device is mounted, carbon dioxide is recovered by the $CO_2$ recovery device, and the recovery amount of carbon dioxide is increased. The recovery amount of carbon dioxide is detected by a recovery state determination unit that determines the recovery amount or the recovery state, image data corresponding to the detected recovery amount or the recovery state is created, and an image corresponding to the image data is displayed on a display screen. The image data and the image according thereto are image data and an image corresponding to the recovery amount and the recovery state of carbon dioxide, and vary depending on the recovery amount and the recovery state of carbon dioxide. Therefore, by using the display device of the present disclosure, the occupant or owner of the vehicle can obtain the recovery amount and the recovery state (or a recovery situation) of carbon dioxide. As a result of the recognition, the occupant's motivation or willingness to use the $CO_2$ recovery device more effectively is stimulated, and he/she can have be motivated to use the vehicle on which the $CO_2$ recovery device is mounted frequently, thereby contributing to the reduction of an increase of $CO_2$ in the atmosphere.

In addition, in the above aspect of the present disclosure, the displayed image may be, for example, an image showing the adsorption amount or the adsorption state in the adsorption unit (a $CO_2$ tank), an image showing the recovery amount or the recovery state of carbon dioxide, an image showing where the carbon dioxide being recovered is from among the exhaust gas, the atmosphere, and the air inside a cabin of the vehicle, an image showing a recovery rate of carbon dioxide, or an image showing an actual discharge rate (the recovery rate with respect to the discharging rate) of carbon dioxide. Therefore, for example, when the amount of carbon dioxide adsorbed by the adsorption unit has reached, or is close to reaching, the limit value, the occupant recognizing it is promoted to extract carbon dioxide to a recovery stand. In addition, since the capacity of the adsorption unit is emptied after the extraction, the extraction serves as a motivation to recover carbon dioxide again. Further, by recognizing the recovery amount, the recovery rate, or the like, the occupant is stimulated to increase the recovery amount further. As such, when the occupant can be motivated to use a vehicle on which a $CO_2$ recovery device is mounted, it is possible to more actively promote the use of a vehicle on which a $CO_2$ recovery device is mounted. In addition, it is possible to promote recovery of carbon dioxide by using the vehicle, thereby contributing to the reduction of global warming.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 20 is a diagram illustrating an example of an HMI display when the control example of FIG. 19 is executed;

DETAILED DESCRIPTION OF EMBODIMENTS

An embodiment of the present disclosure will be described with reference to the drawings. The embodiment to be described below is merely an example in which the present disclosure is specified, and does not limit the present disclosure.

Figure 1:
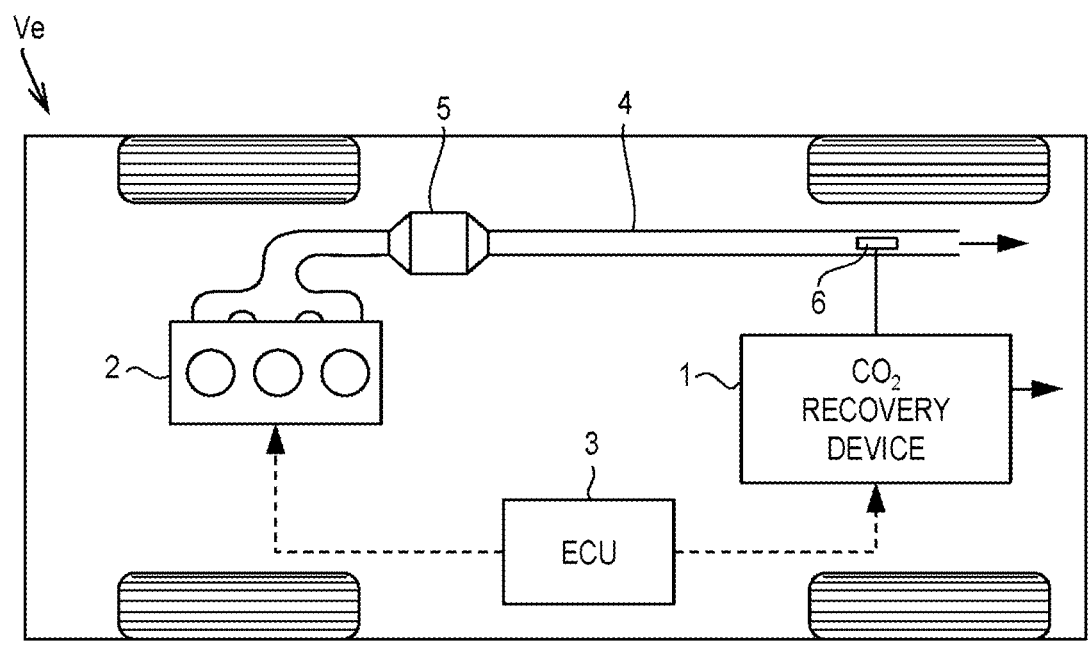
FIG. 1 is a diagram schematically illustrating a vehicle according to an embodiment of the present disclosure.

A display device according to the present disclosure is provided in a vehicle $V_e$ on which a $CO_2$ recovery device 1 is mounted. FIG. 1 is a diagram schematically illustrating an example of the vehicle $V_e$ on which the $CO_2$ recovery device 1 is mounted. The vehicle $V_e$ includes, as a driving force source, an internal combustion engine (hereinafter, referred to as an engine) 2, such as a gasoline engine and a diesel engine. The vehicle $V_e$ according to the present disclosure may be a so-called hybrid vehicle including a motor as a driving force source, in addition to the engine 2. The engine 2 includes a fuel injection device, an electronic throttle valve, or the like, which are controlled by an ECU 3, and is configured to be capable of electrically controlling rotation speed or output torque. The $CO_2$ recovery device 1 is provided, being connected to an exhaust system 4 of the engine 2. The exhaust system 4 is similar to an exhaust system of a conventional general vehicle, and includes an exhaust purification catalyst 5, a muffler (not shown), and the like. The $CO_2$ recovery device 1 is provided on the downstream side of the exhaust system 4. Moreover, the exhaust system 4 is provided with a heat storage 6 that stores heat discharged from the engine 2. The $CO_2$ recovery device 1 may be provided, for example, inside, or in the vicinity of, a luggage space of the vehicle $V_e$.

Figure 2:
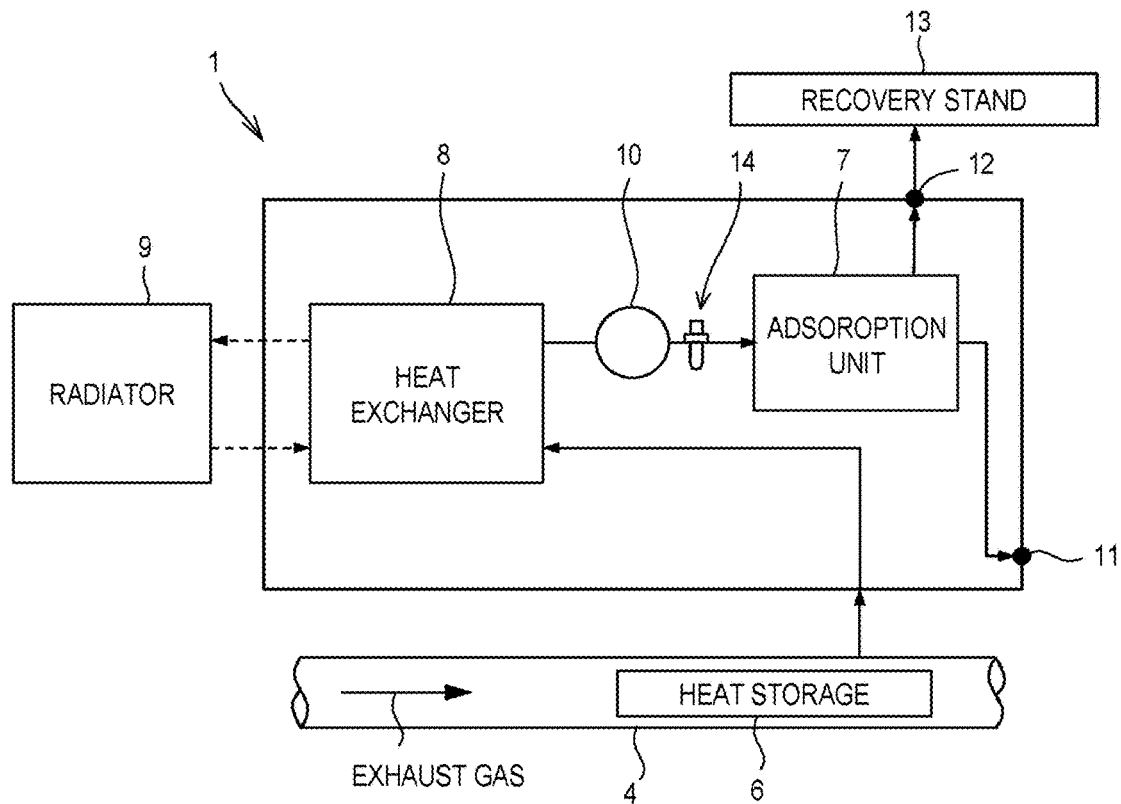
FIG. 2 is a block diagram schematically illustrating a $CO_2$ recovery device.

FIG. 2 is a block diagram illustrating a basic configuration of the $CO_2$ recovery device 1 according to the embodiment of the present disclosure. The $CO_2$ recovery device 1 is configured to recover carbon dioxide from an exhaust gas or a gas by bringing into contact, with a capturing agent, the exhaust gas containing carbon dioxide discharged from the engine 2 to the exhaust system 4 or the gas containing carbon dioxide inside the cabin of the vehicle $V_e$ or outside the vehicle $V_e$. Examples of capturing (a recovery method) carbon dioxide may include a physical adsorption method, a physical absorption method, a chemical absorption method, and a cryogenic extraction method.

In the physical adsorption method, for example, carbon dioxide is adsorbed on a solid adsorbent by bringing into contact, with an exhaust gas, the solid adsorbent, such as activated carbon and zeolite, and then the carbon dioxide is desorbed and recovered from the solid adsorbent by heating or decompressing the solid adsorbent.

In the physical absorption method, carbon dioxide is physically absorbed into an absorbing solution under high pressure and low temperature by bringing into contact, with an exhaust gas, the absorbing solution, such as methanol and ethanol, capable of dissolving carbon dioxide, and then the carbon dioxide is recovered from the absorbing solution by heating or decompressing the absorbing solution.

In the chemical absorption method, carbon dioxide is absorbed into an absorbing solution, such as amine, capable of dissolving carbon dioxide using a chemical reaction by bringing into contact, with an exhaust gas, the absorbing solution, and then the carbon dioxide is dissociated and recovered from the absorbing solution by heating the absorbing solution.

In the cryogenic extraction method, carbon dioxide is liquefied by compressing and cooling an exhaust gas, and then the carbon dioxide is recovered by distilling the liquefied carbon dioxide.

In the embodiment of the present disclosure, for the recovery of carbon dioxide, the physical adsorption method is adopted in which carbon dioxide is recovered by adsorbing the carbon dioxide contained in an exhaust gas or in the atmosphere on a capturing agent, such as an activated carbon and zeolite. Further, since the capturing of carbon dioxide using a capturing agent is reversible, carbon dioxide may be, for example, captured in a low temperature and released in a high temperature. Alternatively, carbon dioxide may be captured in a state of relatively high pressure, and released as the pressure decreases.

In an example illustrated in FIG. 2, a heat exchanger 8 is provided on the upstream side of an adsorption unit 7 that captures carbon dioxide. The adsorption unit 7 functions as a $CO_2$ tank that temporarily reserves the captured carbon dioxide. The heat exchanger 8 cools a gas (such as an exhaust gas from the engine 2 or the atmosphere) containing carbon dioxide to a temperature equal to or lower than the temperature at which the carbon dioxide is adsorbed by the adsorption unit 7. The heat exchanger 8 may be configured to, for example, exchange heat between a coolant that is cooled in a radiator 9 and the gas. A pump 10 that sends an exhaust gas, and the like, to the adsorption unit 7 is provided between the heat exchanger 8 and the adsorption unit 7. The exhaust gas from which the carbon dioxide has been recovered in the adsorption unit 7 is released into the atmosphere through a discharge port 11, or returned to the above-described exhaust system 4 and released to the outside of the vehicle $V_e$ together with other exhaust gases. Further, the carbon dioxide desorbed from the capturing agent by heating or decompressing the adsorbent is discharged to a predetermined recovery stand 13 through a recovery port 12. The recovery stand 13 is equivalent to "recovery equipment" in the embodiment of the present disclosure, and is provided at a gas station, a service area or a parking area on expressways, a parking lot at commercial facilities, or the like.

In addition, a flow rate sensor 14 that detects a flow rate of the exhaust gas introduced into the adsorption unit 7 is provided between the heat exchanger 8 and the adsorption unit 7. Therefore, the amount of carbon dioxide adsorbed by the adsorption unit 7 may be estimated based on the flow rate of the exhaust gas that is detected by the flow rate sensor 14.

The ECU 3 that controls the $CO_2$ recovery device 1 is provided. The ECU 3 is equivalent to the "controller" in the embodiment of the present disclosure. The ECU 3 is mainly composed of a microcomputer, and is configured to control, for example, supply and stop of the exhaust gas to the adsorption unit 7, and adsorption and desorption of carbon dioxide by the adsorption unit 7 by executing calculation using input data, data stored in advance, and the like, and outputting a result of the calculation as a command signal.

Here, the detection of the recovery amount of carbon dioxide will be described. For example, the concentration of the carbon dioxide contained in the exhaust gas from the engine 2 is substantially a constant value or a value within a constant range while the engine 2 is normally operating (combustion). Thus, when the amount of exhaust gas branched from the exhaust system 4 and circulated to the $CO_2$ recovery device 1 is obtained, the amount of carbon dioxide supplied to the $CO_2$ recovery device 1 can be obtained. On the other hand, in cases such as when the throttle opening or a fuel injection amount is rapidly increased during rapid acceleration, and the like, and when low throttle opening is continued during traffic congestion, the concentration of carbon dioxide differs from that during normal driving. Thus, the amount of carbon dioxide can be obtained by executing a correction according to a driving state. Further, the rate of the carbon dioxide that can be captured in the adsorption unit 7 varies depending on a temperature and flow velocity of the exhaust gas, but can be obtained based on an experiment, and the like. Therefore, by measuring the flow rate, the flow velocity, the temperature, or the like, of the exhaust gas flowing into the adsorption unit 7, the recovery amount (an adsorption amount) of carbon dioxide per unit time can be detected, and by integrating the detected recovery amounts, the amount of carbon dioxide captured in the adsorption unit 7, that is, the recovery amount of carbon dioxide can be obtained.

Since the recovery amount of carbon dioxide can be sequentially obtained, the recovery amount of carbon dioxide from the start of driving can be obtained from, for example, the recovery amount between the start and stop of the driving of the vehicle $V_e$, or between a driver's boarding and exiting of the vehicle $V_e$. Therefore, the recovery amount of carbon dioxide can be detected by providing a sensor, such as the flow rate sensor 14, on the upstream side or the downstream side of the adsorption unit 7 and executing calculation based on a detection signal. Alternatively, a sensor that directly detects the amount of carbon dioxide being captured in the adsorption unit 7 may be provided, or a sensor that detects the amount of carbon dioxide in a tank (not shown), which reserves the carbon dioxide desorbed from the adsorption unit 7, by using the pressure, and the like, in the tank may also be provided. In the above cases, all of the already recovered carbon dioxide can be detected. Further, since exhaust gas is generated by combustion of fuel, there is a correlation between a generated amount of carbon dioxide and the fuel injection amount. Therefore, the amount of carbon dioxide can also be detected based on the fuel injection amount.

The vehicle $V_e$ configured as described above can recover carbon dioxide using the above-described $CO_2$ recovery device 1. Meanwhile, in a vehicle on which a well-known $CO_2$ recovery device 1 is mounted, it is difficult for the occupant or user of the vehicle $V_e$ to recognize the recovery state or the recovery situation of carbon dioxide. Therefore, the embodiment according to the present disclosure is configured to allow the occupant or user to be able to recognize the recovery state of carbon dioxide.

Figure 3:
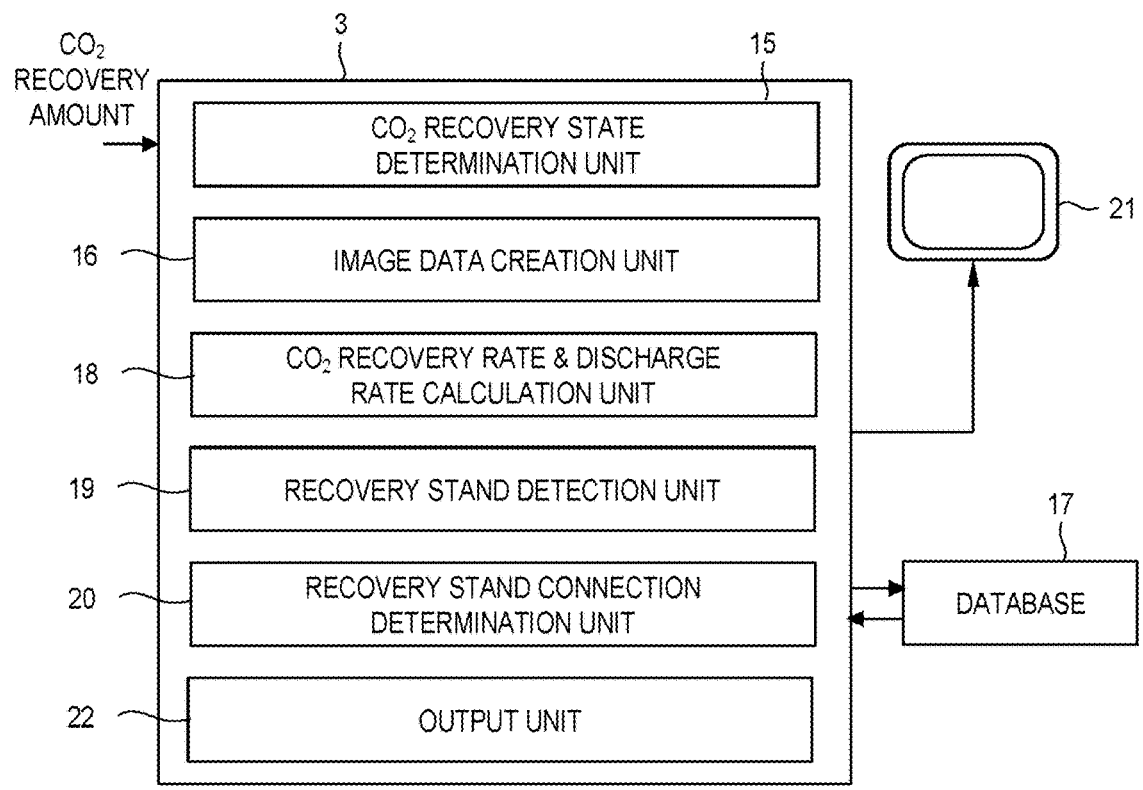
FIG. 3 is a block diagram for describing a configuration of an electronic control unit (ECU) according to the embodiment of the present disclosure.

FIG. 3 is a block diagram for describing the control example. The ECU 3 receives the recovery amount of carbon dioxide as detected data, and includes a $CO_2$ recovery state determination unit 15 that determines the recovery state of carbon dioxide based on the detected data input to the ECU 3. The $CO_2$ recovery state determination unit 15 also determines where the carbon dioxide being recovered is from among the exhaust gas of the engine 2, the atmosphere outside the vehicle $V_e$, and the air inside the cabin of the vehicle $V_e$. In addition, the ECU 3 includes an image data creation unit 16 that creates image data corresponding to the recovery state of the carbon dioxide calculated by the $CO_2$ recovery state determination unit 15. The image data creation unit 16 may be configured to create an image by executing calculation using a program prepared in advance using the recovery amount or the recovery state of carbon dioxide, or select image data corresponding to the recovery amount of carbon dioxide from a display image database 17 prepared in advance.

Further, the ECU 3 includes a carbon dioxide recovery rate and discharge rate calculation unit 18 that calculates a recovery rate or discharge rate of $CO_2$ from the recovery amount and discharge amount of carbon dioxide, a recovery stand detection unit 19 that detects the location of the recovery stand 13, and a recovery stand connection determination unit 20 that determines whether the recovery stand 13 is connected to the vehicle $V_e$.

Meanwhile, the vehicle $V_e$ includes an HMI 21 as a display that displays the image. The HMI 21 is configured to display an image on a liquid crystal display, a TTL display, or the like, and may share a display, for example, in a navigation system. Moreover, the ECU 3 includes an output unit 22 that digitizes an image, the recovery state of carbon dioxide, or the like, based on the created image data, and displays the above on the HMI 21. Hereinafter, a control example executed by the ECU 3 will be described.

Figure 4:
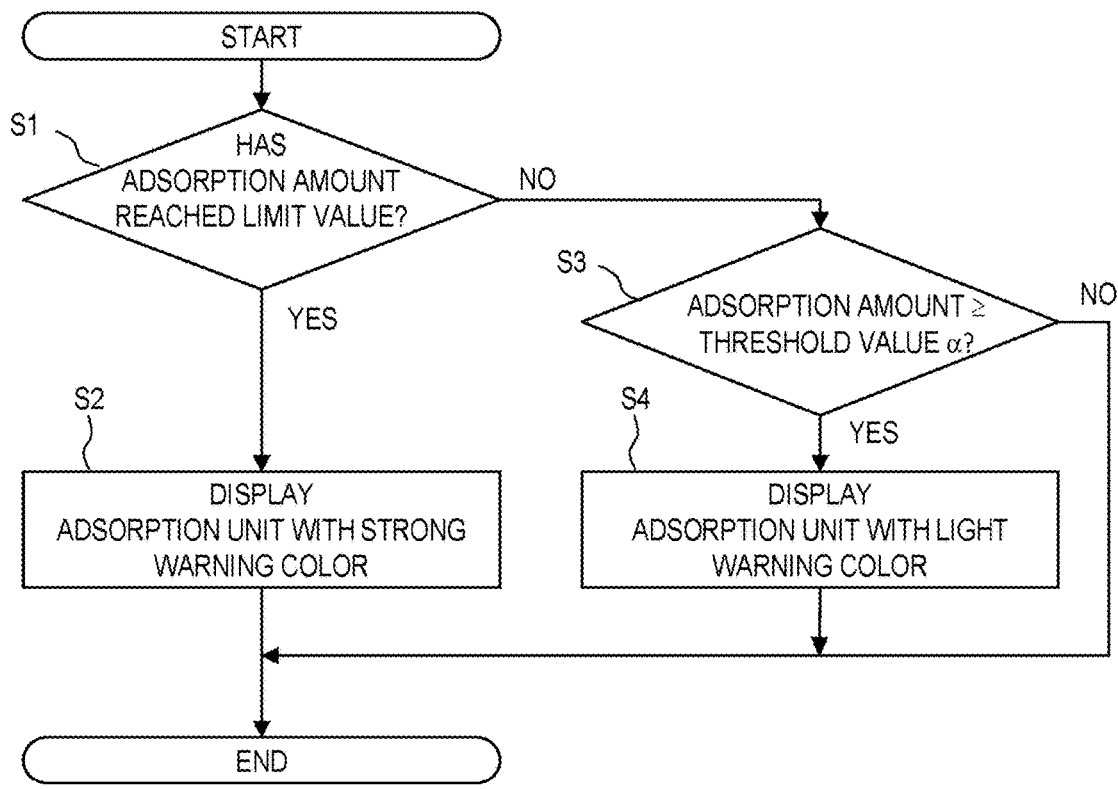
FIG. 4 is a flowchart for describing an example of control for determining an adsorption amount in an adsorption unit.
Figure 5:
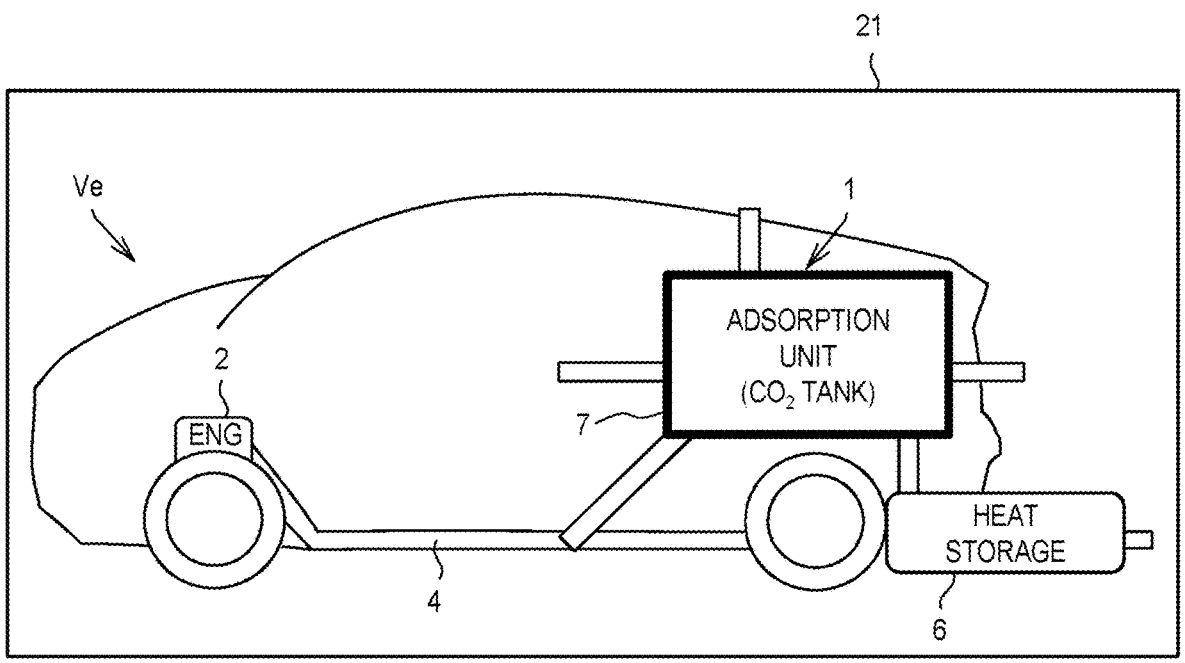
FIG. 5 is a diagram illustrating an example of a human machine interface (HMI) display when the control example of FIG. 4 is executed.

FIG. 4 is a flowchart for describing an example of control having a configuration in which the recovery state of carbon dioxide is displayed on the HMI 21, and particularly, for illustrating the recovery state (that is, the adsorption state or reserved state of carbon dioxide in the adsorption unit 7) in the adsorption unit 7. First, it is determined whether the amount of carbon dioxide adsorbed by the adsorption unit 7 has reached a limit value (step S1). This is a step for determining whether the amount of carbon dioxide that can be adsorbed by the adsorption unit 7 has reached the limit, and the determination can be made from the recovery amount of carbon dioxide input to the ECU 3. Further, when a separate $CO_2$ tank is provided, it is determined whether the tank is full or has reached a limit. Therefore, when the determination in step S1 is affirmative, that is, when it is determined that the amount of carbon dioxide adsorbed by the adsorption unit 7 has reached the limit value, a strong warning color indicating that the amount of carbon dioxide adsorbed by the adsorption unit 7 has reached the limit value is displayed on the HMI 21 (step S2). In other words, a display, from which the occupant or user can visually recognize that the adsorption amount has reached the limit value, is displayed on the HMI 21. For example, as illustrated in FIG. 5, the display is displayed by making a portion of the adsorption unit 7 surrounded by a thick frame red (or a color similar to red), such that the warning display can be recognized as strong.

On the contrary, when the determination in step S1 is negative, that is, when it is determined that the amount of carbon dioxide adsorbed by the adsorption unit 7 has not reached the limit value, it is determined whether the amount of carbon dioxide adsorbed by the adsorption unit 7 is equal to or greater than a threshold value α set in advance (step S3). The threshold value α is set to a value of, for example, approximately 80% of the amount (the limit value) of the carbon dioxide that can be adsorbed by the adsorption unit 7. In other words, in step S3, it is determined whether the adsorption amount is close to reaching the limit, and thus, the threshold value α may be appropriately set as long as it can be determined whether the adsorption amount is close to reaching the limit.

When a determination in step S3 is affirmative, that is, when a current amount of carbon dioxide adsorbed by the adsorption unit 7 is equal to or greater than the threshold α, a warning color indicating that the amount of carbon dioxide adsorbed by the adsorption unit 7 is close to reaching the limit value is displayed on the HMI 21 (step S4). In other words, a display, from which the occupant or user can visually recognize that the adsorption amount is close to reaching the limit, is displayed on the HMI 21. For example, as illustrated in FIG. 5, the display is displayed by making the portion of the adsorption unit 7 surrounded by the thick frame yellow (or a color similar to yellow), or the like, so that a warning display having a smaller degree of caution than the warning display in step S2 can be recognized.

On the other hand, when the determination in step S3 is negative, that is, when the current adsorption amount of carbon dioxide is smaller than the threshold value α, the control example is temporarily ended. Although the determination in step S3 is negative, a color, from which the passenger or user can recognize the adsorption state, may also be displayed, similar to steps S2 and S4. For example, as illustrated in FIG. 5, the display is displayed by making the portion of the adsorption unit 7 surrounded by the thick frame green, white, or the like, so that it can be recognized that there is relatively sufficient room for carbon dioxide to be adsorbed in the adsorption unit 7.

Figure 6:
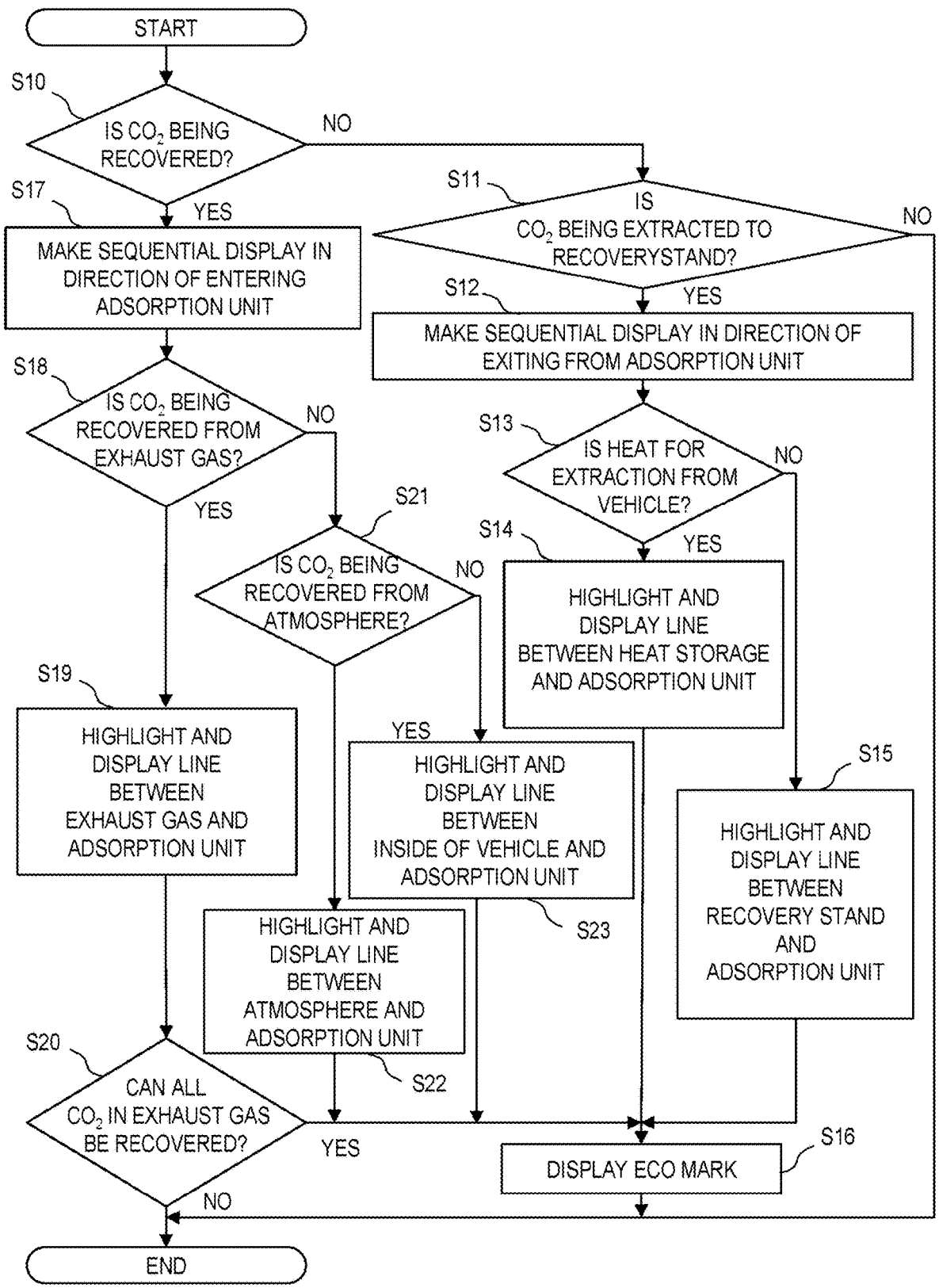
FIG. 6 is a flowchart for describing an example of control for determining a recovery state or an extraction state of carbon dioxide.

FIG. 6 is a flowchart for describing an example of control having the configuration in which the recovery state of carbon dioxide is displayed on the HMI 21, and particularly, for illustrating whether carbon dioxide is being recovered from among the exhaust gas, the atmosphere, or the air inside the cabin of the vehicle, or whether the recovered carbon dioxide is being extracted to the recovery stand 13. First, it is determined whether carbon dioxide is being recovered (step S10). This can be determined from, for example, the recovery state of carbon dioxide in the adsorption unit 7 described above. When the amount of carbon dioxide adsorbed by the adsorption unit 7 has reached the limit value, a determination in step S10 is negative. Therefore, when the determination in step S10 is negative, that is, when carbon dioxide is not being recovered, it is determined whether the carbon dioxide adsorbed by the adsorption unit 7 is being extracted to the recovery stand 13 (step S11). When the amount of carbon dioxide adsorbed by the adsorption unit 7 has reached the limit value, it is assumed that the recovered carbon dioxide is being extracted to the recovery stand 13. Therefore, for example, when the vehicle $V_e$ is connected to the recovery stand 13 by a hose, or the like, it can be determined that carbon dioxide is being extracted to the recovery stand 13. Whether the vehicle $V_e$ is connected to the recovery stand 13 is determined by the above-described recovery stand connection determination unit 20. Therefore, when a determination in step S11 is negative, that is, when it is determined that carbon dioxide is not being extracted to the recovery stand 13, the control example is temporarily ended without executing the subsequent control.

On the contrary, when the determination in step S11 is affirmative, that is, when it is determined that carbon dioxide is being extracted to the recovery stand 13, a sequential display is made in the direction of exiting the adsorption unit 7 (that is, toward the recovery stand 13) to display that carbon dioxide is being extracted from the adsorption unit 7 to the recovery stand 13 (step S12).

Figure 7:
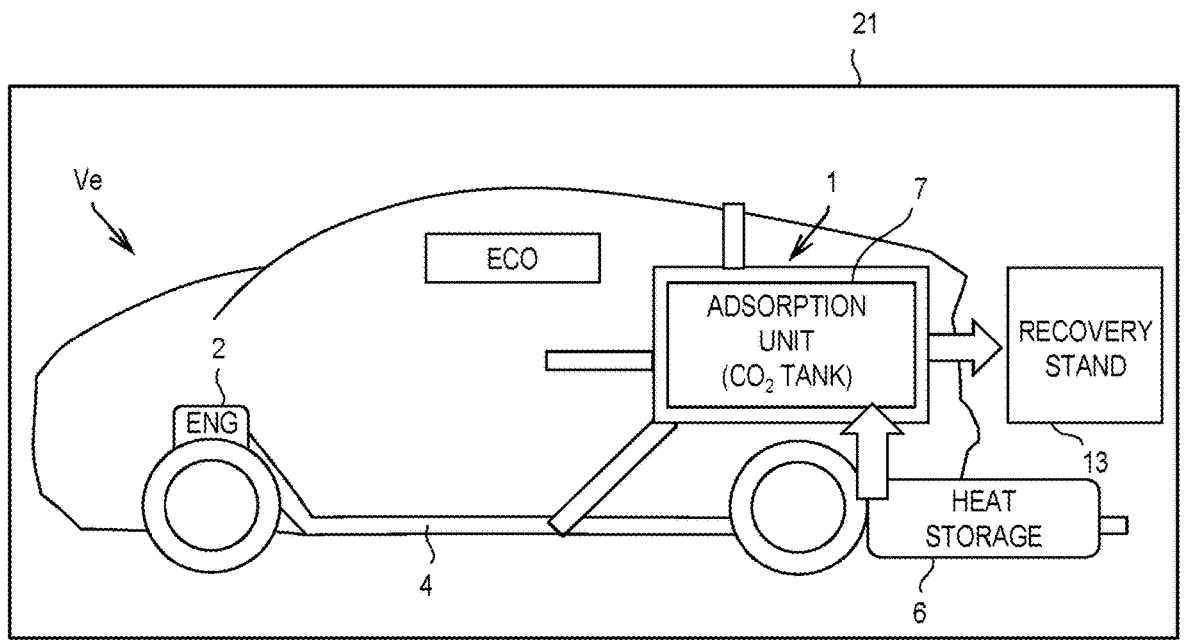
FIG. 7 is a diagram illustrating an example of an HMI display when the control example of FIG. 6 is executed, and particularly, illustrating an example in which carbon dioxide is extracted to a recovery stand using heat of a heat storage.

Subsequently, it is determined whether carbon dioxide is being extracted from the adsorption unit 7 to the recovery stand 13 using the heat stored in the vehicle $V_e$ (step S13). This is a step of determining whether carbon dioxide is being extracted to the recovery stand 13 by supplying the heat stored in the vehicle $V_e$ to the adsorption unit 7 and desorbing carbon dioxide from the adsorption unit 7, or by using external energy (for example, energy supplied from the recovery stand 13). For example, when the amount of heat stored in the heat storage 6 is equal to or greater than a predetermined amount, the determination in step S13 is affirmative. Therefore, when the determination in step S13 is affirmative, that is, when carbon dioxide is extracted to the recovery stand 13 by supplying heat from the heat storage 6 to the adsorption unit 7, a line between the heat storage 6 and the adsorption unit 7 is highlighted and displayed on the HMI 21 as illustrated in FIG. 7 (step S14). At the same time, a highlight display indicating that carbon dioxide is being extracted to the recovery stand 13 is made.

Figure 8:
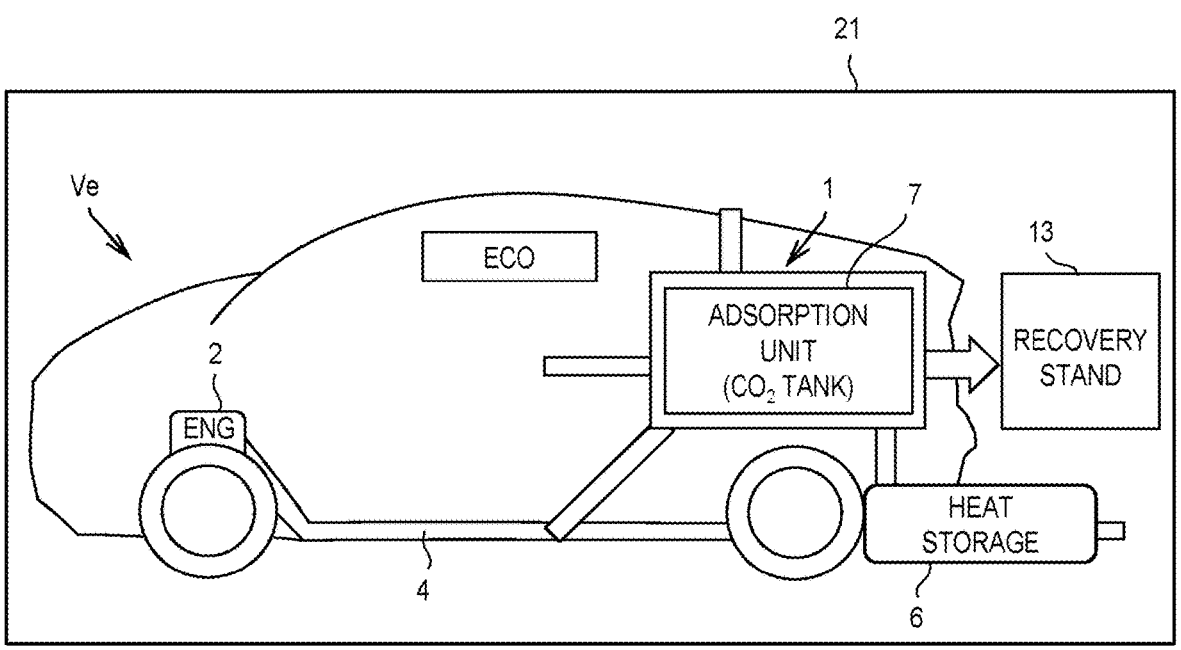
FIG. 8 is a diagram illustrating an example of an HMI display when the control example of FIG. 6 is executed, and particularly, illustrating an example in which carbon dioxide is extracted to the recovery stand using external energy.

On the contrary, when the determination in step S13 is negative, that is, when it is determined that carbon dioxide is being extracted not using the heat stored in the vehicle $V_e$, the line between the adsorption unit 7 and the recovery stand 13 is highlighted and displayed as illustrated in FIG. 8 (step S15). In other words, a display indicating that carbon dioxide is being extracted using the external energy is made.

Then, after the highlight display indicating that carbon dioxide is being extracted is made in step S14 or step S15, an "ECO" mark representing a contribution to environmental conservation is displayed (step S16). In other words, since it is possible to contribute to the reduction of greenhouse gases and global warming by recovering carbon dioxide in the $CO_2$ recovery device 1 and extracting the recovered carbon dioxide to the recovery stand 13, the "ECO" mark is displayed.

On the other hand, when the determination in step S10 is affirmative, that is, when it is determined that carbon dioxide is being recovered, a sequential display is made in the direction of entering the adsorption unit 7 to display that carbon dioxide is being recovered (step S17). In other words, a display indicating that carbon dioxide is being recovered is made.

Figure 9:
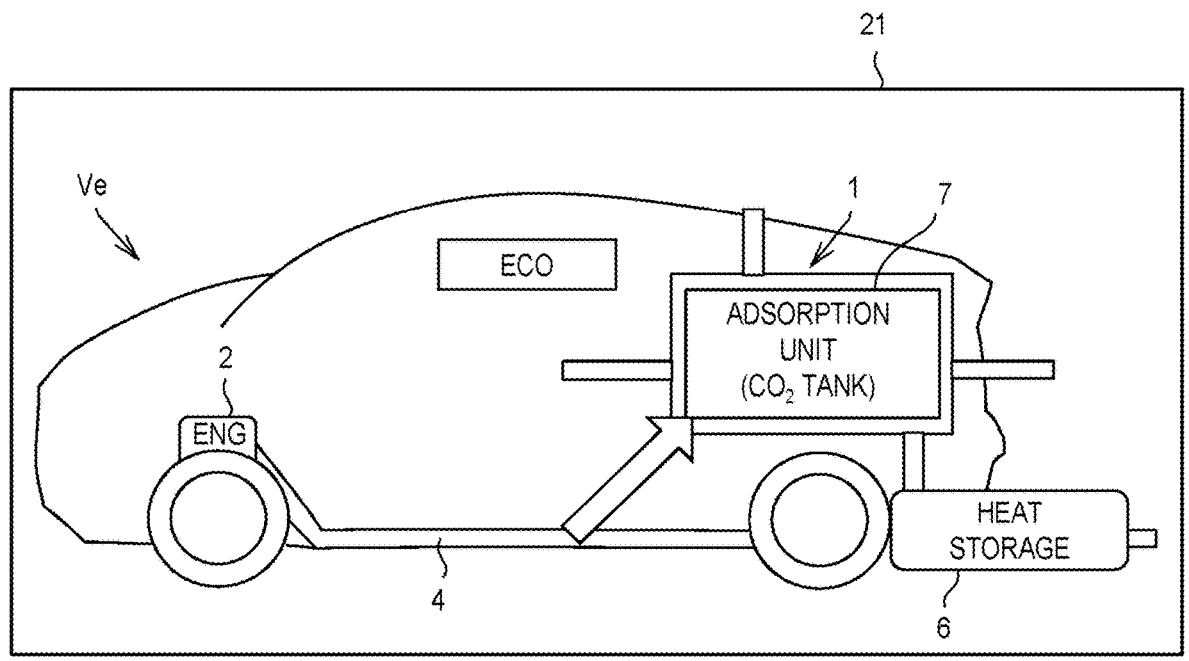
FIG. 9 is a diagram illustrating an example of an HMI display when the control example of FIG. 6 is executed, and particularly, illustrating an example in which carbon dioxide contained in exhaust gas is recovered.

Subsequently, it is determined where the carbon dioxide is being recovered from among the exhaust gas, the atmosphere, and the air inside the cabin of the vehicle $V_e$. First, it is determined whether the carbon dioxide contained in the exhaust gas is being recovered (step S18). A source from which the carbon dioxide is recovered can be determined by the $CO_2$ recovery state determination unit 15 as described above. Therefore, when the determination in step S18 is affirmative, that is, when it is determined that the carbon dioxide contained in the exhaust gas is being recovered, a line between the exhaust system 4 and the adsorption unit 7 is highlighted and displayed on the HMI 21 as illustrated in FIG. 9 (step S19).

Further, it is determined whether all of the carbon dioxide contained in the exhaust gas can be recovered (step S20). In other words, it is determined whether all of the carbon dioxide contained in the exhaust gas can be adsorbed and recovered by the adsorption unit 7. For example, when engine speed is controlled to idle speed, a determination in step S20 is affirmative. Therefore, when the determination in this step S20 is affirmative, that is, when it is determined that all of the carbon dioxide contained in the exhaust gas can be recovered, the "ECO" mark is displayed as illustrated in FIG. 9 (step S16). On the contrary, when the determination in step S20 is negative, that is, when it is determined that all of the carbon dioxide contained in the exhaust gas cannot be recovered, the control example ends.

Figure 10:
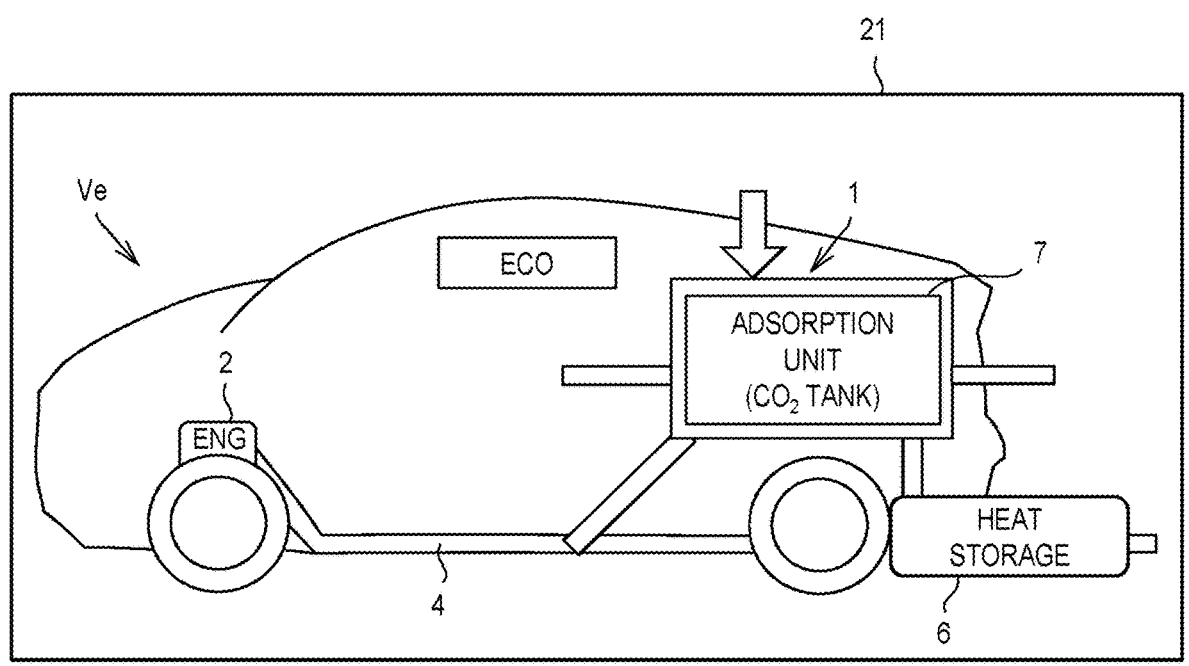
FIG. 10 is a diagram illustrating an example of an HMI display when the control example of FIG. 6 is executed, and particularly, illustrating an example in which carbon dioxide contained in the atmosphere is recovered.

On the other hand, when the determination in step S18 is negative, that is, when it is determined that the carbon dioxide contained in the exhaust gas is not being recovered, it is determined whether the carbon dioxide contained in the atmosphere is being recovered (step S21). The determination is also made by the above-described $CO_2$ recovery state determination unit 15. Therefore, when the determination in step S21 is affirmative, that is, when it is determined that the carbon dioxide contained in the atmosphere is being recovered, a line between the outside of the vehicle $V_e$ (the atmosphere) and the adsorption unit 7 is highlighted and displayed on the HMI 21, as illustrated in FIG. 10 (step S22).

Figure 11:
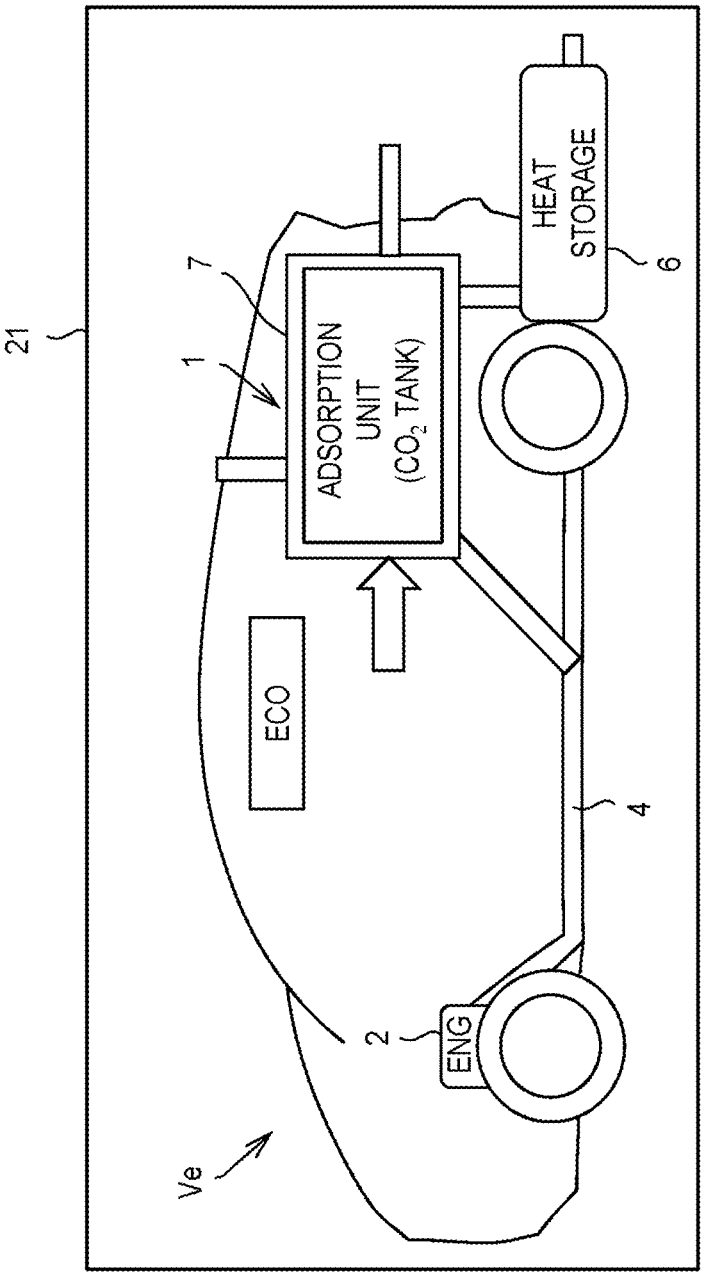
FIG. 11 is a diagram illustrating an example of an HMI display when the control example of FIG. 6 is executed, and particularly, illustrating an example in which carbon dioxide contained in the air inside a cabin of the vehicle is recovered.

On the contrary, when the determination in step S21 is negative, that is, when it is determined that the carbon dioxide contained in the atmosphere is not being recovered, a line between the inside of the cabin of the vehicle $V_e$ and the adsorption unit 7 is highlighted and displayed on the HMI 21, as illustrated in FIG. 11 (step S23). In other words, since it is determined that the carbon dioxide contained in the exhaust gas or the atmosphere is not being recovered, it can be determined that the carbon dioxide contained in the air inside the cabin of the vehicle $V_e$ is being recovered. Thereafter, a highlight display indicating that carbon dioxide is being recovered in step S22 or S23 is made, and then the "ECO" mark is displayed (step S16).

Figure 12:
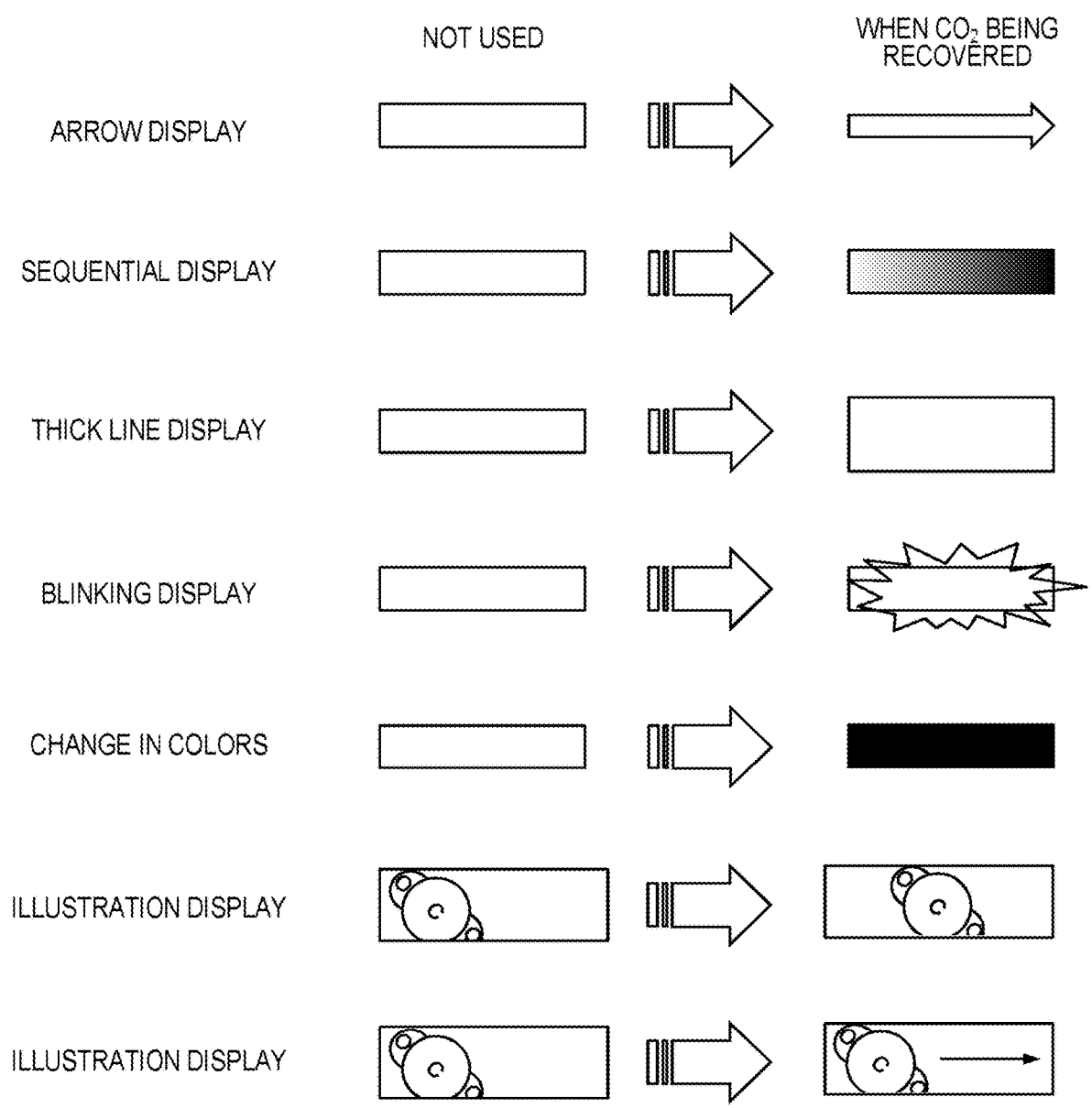
FIG. 12 is a diagram for collectively describing examples of highlight displays.

Here, an example of the highlight display between the exhaust system 4, the outside of the vehicle $V_e$ (the atmosphere), or the inside of the cabin of the vehicle $V_e$, and the adsorption unit 7 will be described. FIG. 12 is a diagram illustrating examples of the highlight displays, and as illustrated here, the displays may be changed between when carbon dioxide is not being recovered (left) and when carbon dioxide is being recovered (right). For example, when carbon dioxide is being recovered, the display is made with an arrow, a sequential display, a thick line, blinking, a change in colors, or, in addition to these displays, a combination of illustrations representing a molecular structure of carbon dioxide.

Figure 13:
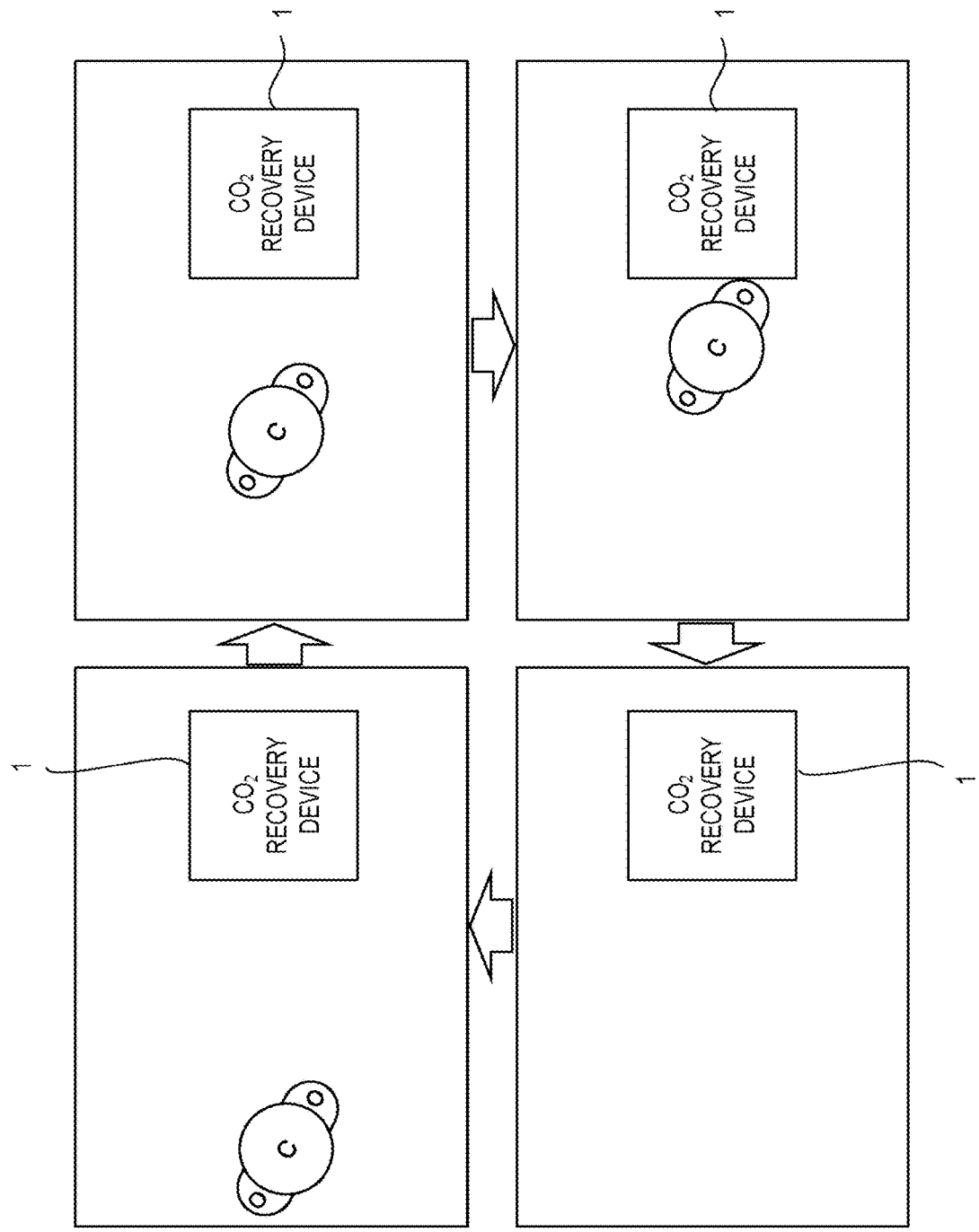
FIG. 13 is a diagram for describing highlight displays, and particularly, illustrating, in steps (four steps), procedures in which a molecule of carbon dioxide is heading toward the $CO_2$ recovery device.
Figure 14:
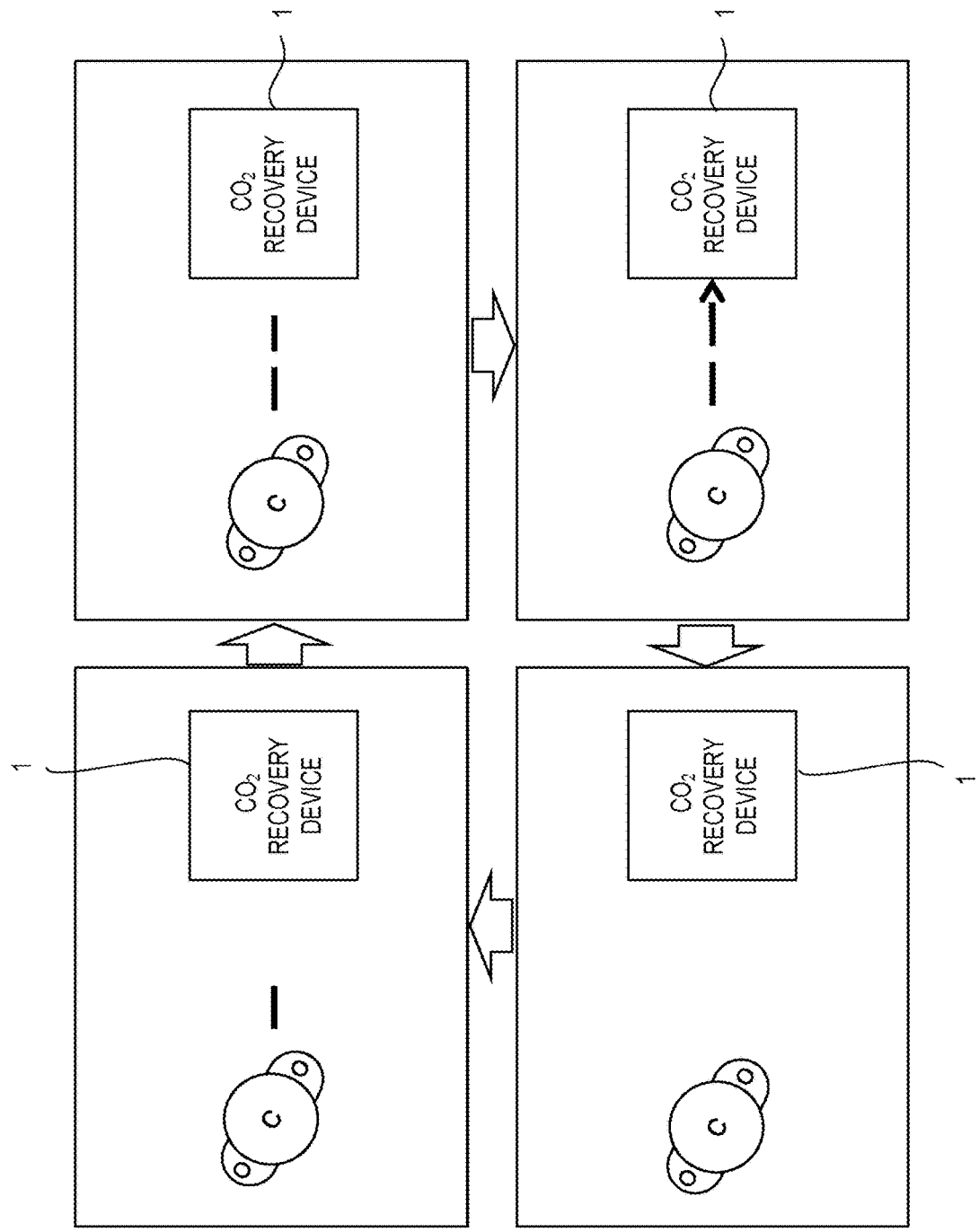
FIG. 14 is a modified example of FIG. 13.
Figure 15:
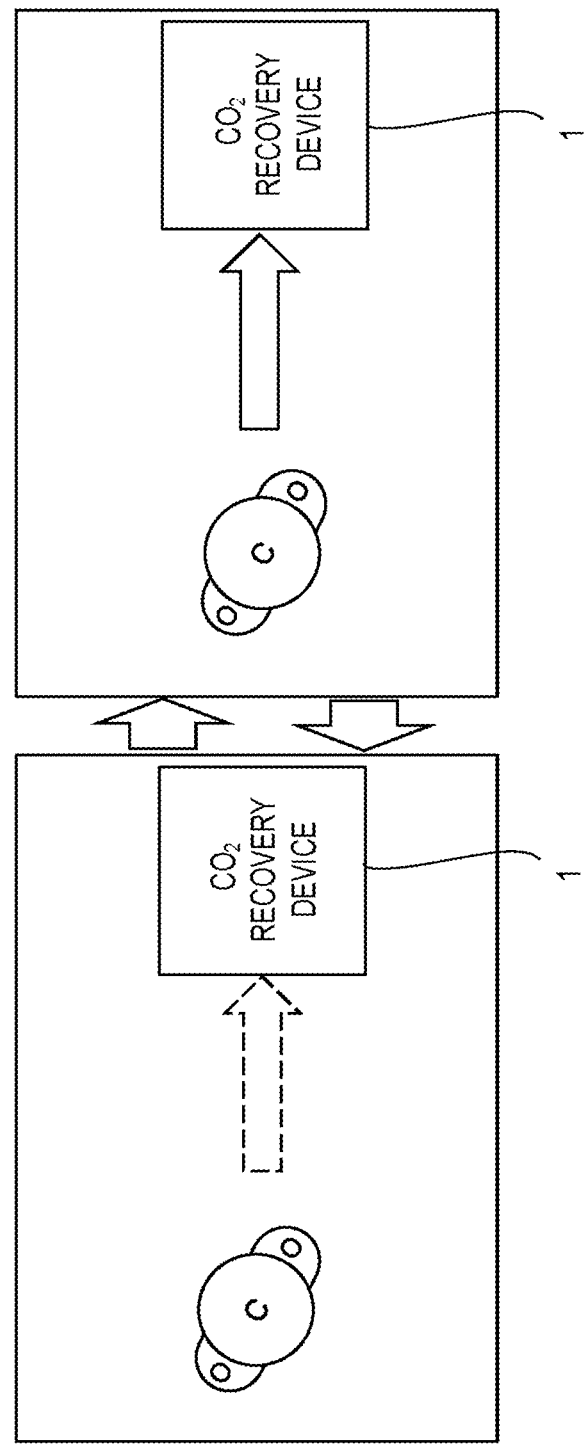
FIG. 15 is a diagram for describing highlight displays, and particularly, illustrating, in steps (two steps), procedures in which the molecule of carbon dioxide is heading toward the $CO_2$ recovery device.
Figure 16:
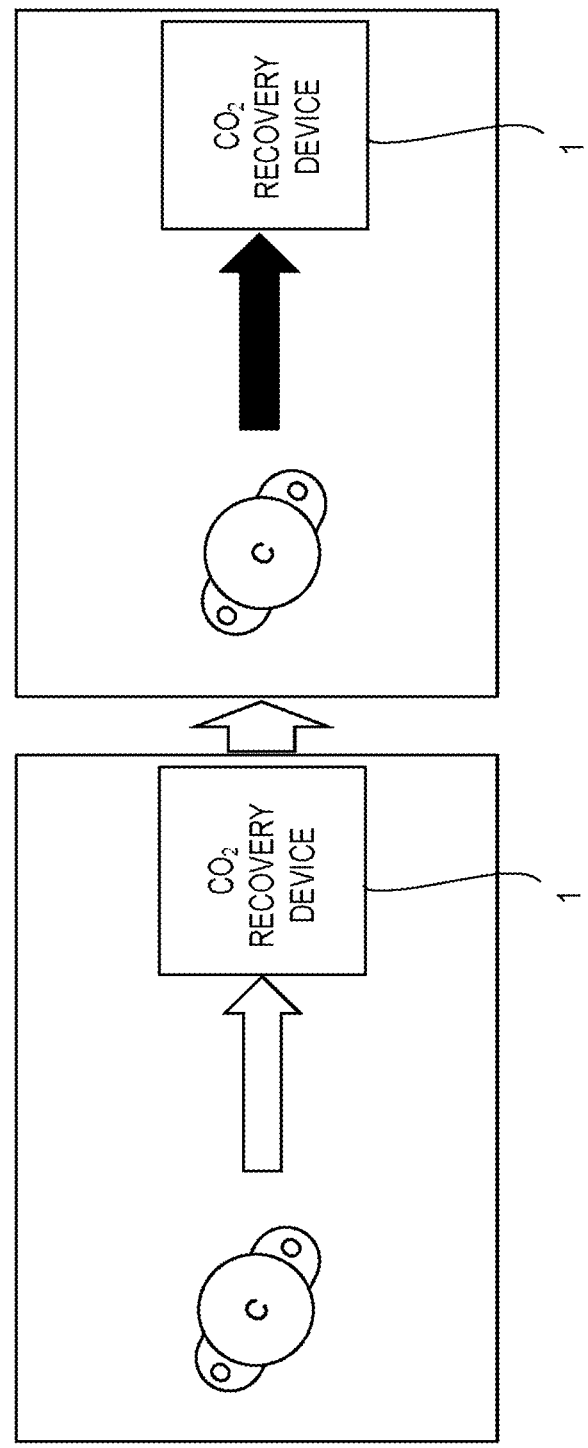
FIG. 16 is a modified example of FIG. 15.
Figure 17:
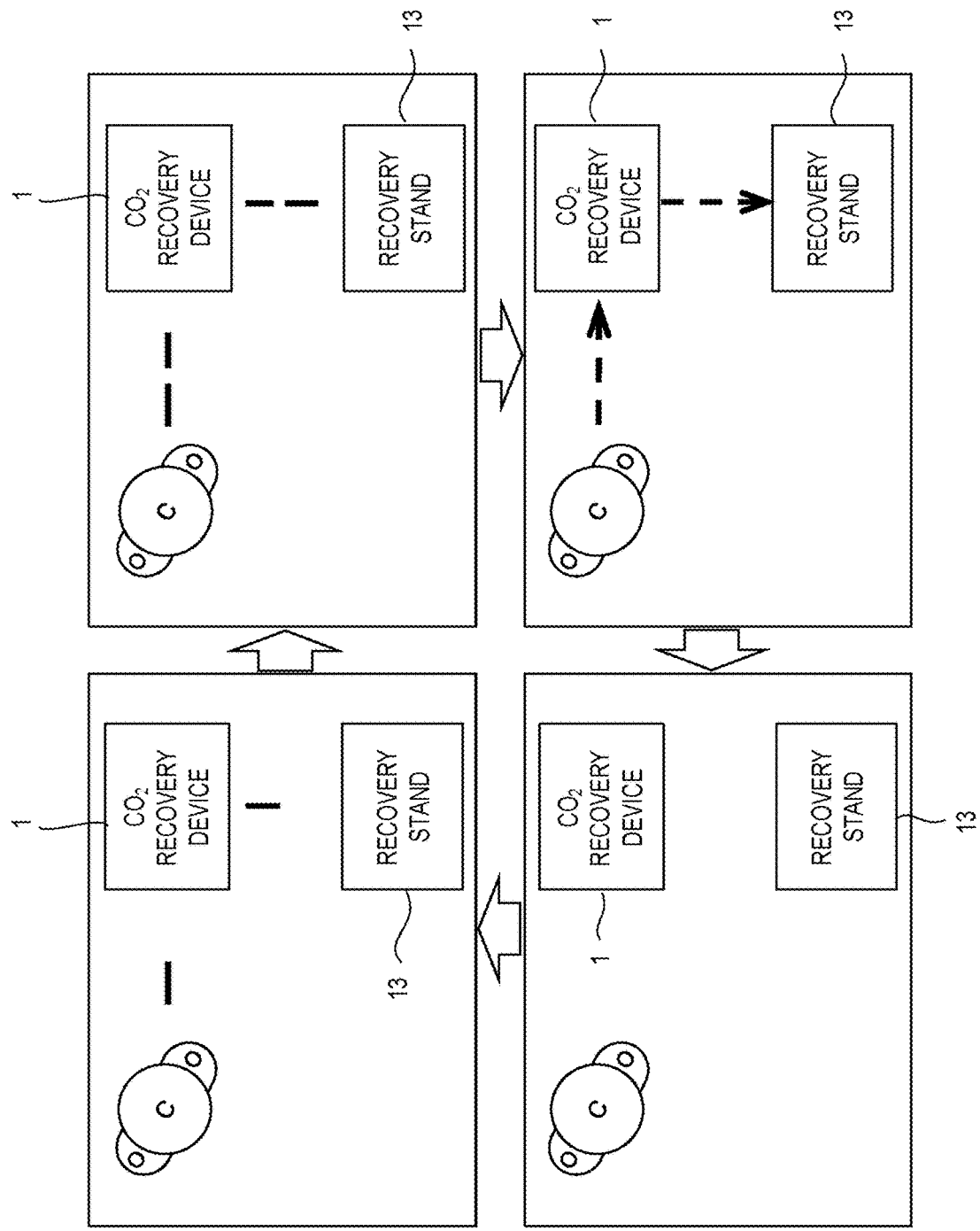
FIG. 17 is a diagram for describing highlight displays, and particularly, illustrating, in steps, procedures in which the molecule of carbon dioxide is heading toward the $CO_2$ recovery device and the recovery stand.

In addition, the highlight display may be made by changing images in steps and displaying them on the HMI 21. The display image is an image corresponding to the recovery state of carbon dioxide or the extraction state of carbon dioxide to the recovery stand 13. FIG. 13 is an example illustrating the recovery state of carbon dioxide, and displays, in steps, procedures in which a molecule of carbon dioxide is heading toward the $CO_2$ recovery device 1 in the direction of arrows from the lower left image. Moreover, FIG. 14 displays the procedures in which a molecule of carbon dioxide is heading toward the $CO_2$ recovery device 1 by adding a change in the arrows. Further, the procedures in which a molecule of carbon dioxide is heading toward the $CO_2$ recovery device 1 may be displayed by a blinking of an arrow as illustrated in FIG. 15, or a change in color of the arrow as illustrated in FIG. 16. In addition, FIG. 17 illustrates the recovery state and the extraction state of carbon dioxide, and displays, in steps, procedures in which a molecule of carbon dioxide is heading toward the recovery stand 13 via the $CO_2$ recovery device 1. In the embodiment of the present disclosure, the change of the images is mainly illustrated in four steps, but other than this, the images may be displayed as images in five or more steps, or a plurality of images in three or less steps.

In addition, these images may be images from which the recovery state of carbon dioxide to the $CO_2$ recovery device 1, or the extraction state of carbon dioxide can be recognized. In other words, the images may be images (for example, images using a plant, or the like) that suggest the recovery state or the extraction state of carbon dioxide.

As described above, in the embodiment of the present disclosure, the fact that carbon dioxide is being recovered is displayed on the HMI 21. For this reason, the occupant can visually recognize the recovery state and the extraction state of carbon dioxide. Since it is widely known that carbon dioxide is a greenhouse gas and thus it is desirable to reduce the amount of carbon dioxide, the occupant who recognizes the recovery state of carbon dioxide comes to realize that he/she is taking an action which contributes to the reduction of greenhouse gases, and this serves as a motivation to encourage the use of the vehicle $V_e$ on which the $CO_2$ recovery device 1 is mounted. In other words, according to the display device of the embodiment of the present disclosure, it is possible to more actively promote the use of the vehicle $V_e$ on which the $CO_2$ recovery device 1 is mounted.

Further, as described above, since the occupant can visually recognize that the recovery state of carbon dioxide has reached, or is close to reaching, the limit, it is possible to increase awareness of carbon dioxide being extracted to the recovery stand 13. In addition, by extracting carbon dioxide to the recovery stand 13, the occupant can obtain an incentive, such as money corresponding to the amount of extracted carbon dioxide. As such, since it is possible to increase the awareness of carbon dioxide being extracted to the recovery stand 13, it is also possible to recover carbon dioxide by the $CO_2$ recovery device 1, and make a smooth cycle of recovery and extraction, thereby contributing to the reduction of global warming.

Figure 18:
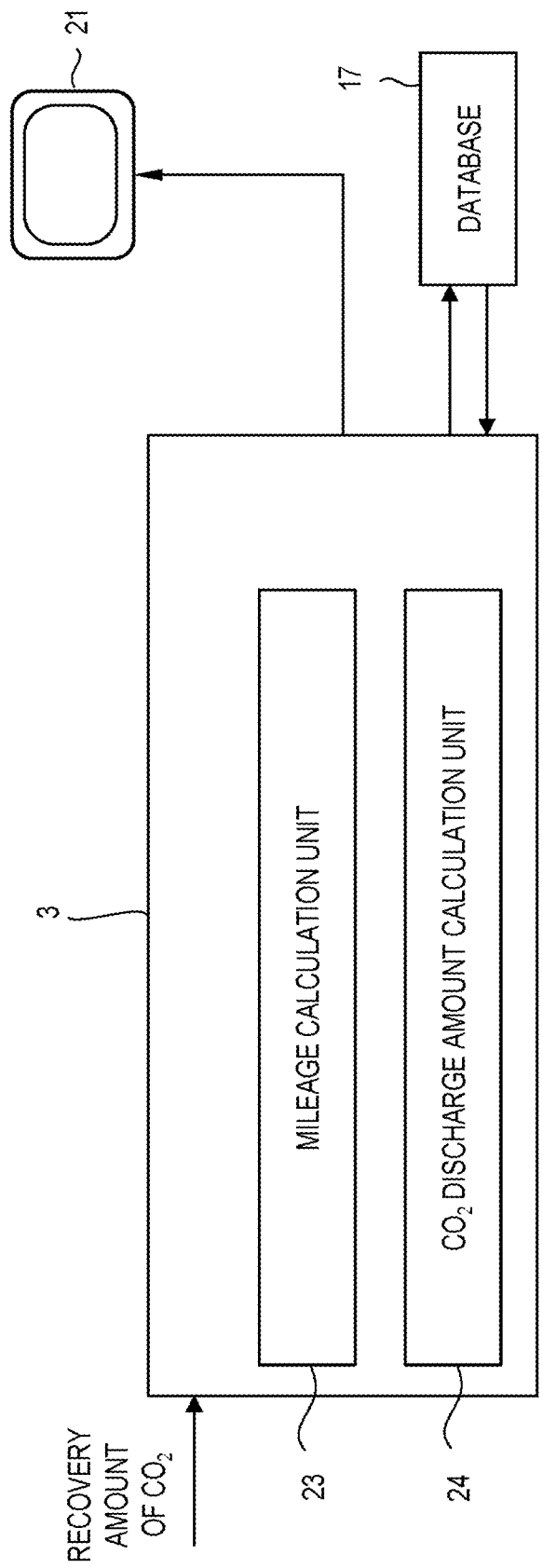
FIG. 18 is a block diagram for describing a configuration of another ECU according to the embodiment of the present disclosure.

Next, another control example according to the embodiment of the present disclosure will be described. The above-described embodiment is configured to output the recovery state of carbon dioxide to the HMI 21 as an image. Meanwhile, even when the occupant can digitally recognize the recovery state, he/she may be motivated to use the vehicle $V_e$ on which the $CO_2$ recovery device 1 is mounted. Therefore, the embodiment of the present disclosure is configured to display the recovery amount and discharge amount of carbon dioxide on the HMI 21, together with the recovery rate and discharge rate of carbon dioxide. FIG. 18 is a block diagram for describing the control example. The ECU 3 further includes a mileage calculation unit 23 and a $CO_2$ discharge amount calculation unit 24. Since other configurations are the same as that of the control examples according to the above-described embodiment, description thereof will be omitted. Hereinafter, control examples executed by the ECU 3 will be described.

Figure 19:
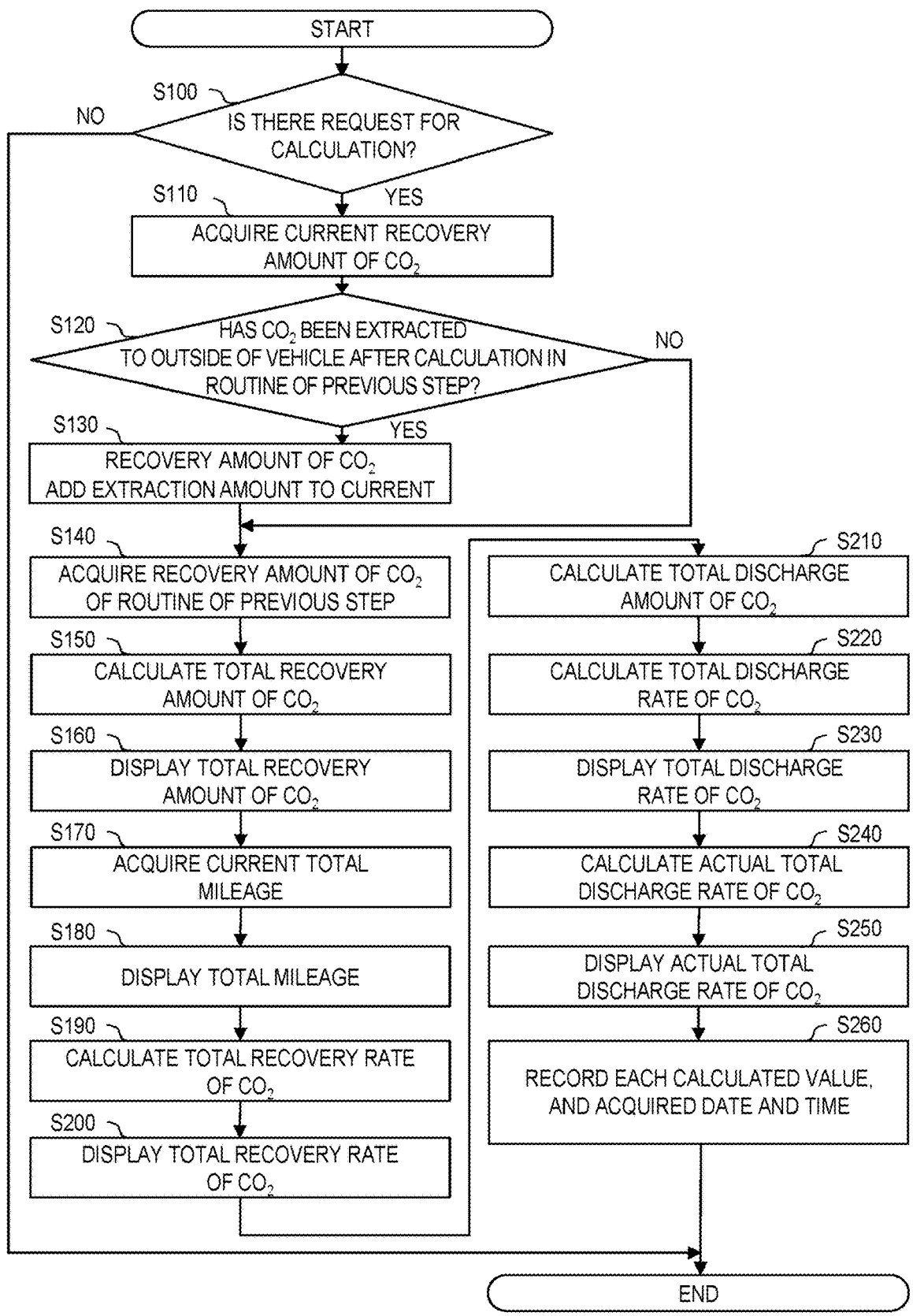
FIG. 19 is a flowchart for describing an example of control for calculating a total recovery amount, total mileage, a recovery rate, a discharge amount, a discharge rate, and an actual discharge rate of carbon dioxide.

FIG. 19 is a flowchart for describing an example of control when the recovery state of carbon dioxide is digitized, and particularly, the control example illustrated in FIG. 19 is configured to calculate, digitize, and display on the HMI 21, the total recovery amount, which is the recovery amount of carbon dioxide, since the purchase of the vehicle $V_e$ by the owner. First, it is determined whether there is a request for calculation of the recovery amount of carbon dioxide (step S100). This determination may be executed, for example, at all times while a ready switch (not shown) of the vehicle $V_e$ is turned on, or at an appropriate timing, such as at each of predetermined times set in advance, whenever the engine 2 is stopped, and when the driver operates a switch for displaying. Therefore, when the determination in step S100 is negative by, for example, turning off the ready switch, the control example is temporarily ended without executing the subsequent control.

On the contrary, when the determination in step S100 is affirmative, that is, when it is determined that there is a request for calculation by, for example, turning on the ready switch, the current recovery amount in the $CO_2$ recovery device 1 (that is, the adsorption amount adsorbed by the adsorption unit 7) is obtained (step S110). This can be acquired from, for example, the recovery amount of carbon dioxide input to the ECU 3, the amount of exhaust gas, or the amount of atmosphere (or the amount of air) introduced into the vehicle $V_e$.

Subsequently, it is determined whether carbon dioxide has been extracted to the outside of the vehicle $V_e$, such as the recovery stand 13, after the calculation of the recovery amount of carbon dioxide in a routine of the previous step (step S120). As described above, the flowchart in FIG. 19 illustrates the control for calculating the total recovery amount. For this reason, when carbon dioxide is being extracted to the outside of the vehicle $V_e$ after the calculation of the total recovery amount of carbon dioxide in the routine of the previous step, the extracted amount of carbon dioxide needs to be added. Therefore, when the determination in step S120 is affirmative, that is, when it is determined that carbon dioxide is being extracted to the outside of the vehicle $V_e$ after the calculation of the total recovery amount of carbon dioxide in the routine of the previous step, the extracted amount of carbon dioxide is added to the recovery amount of carbon dioxide, which has been acquired in step S110 (step S130). In other words, the amount of carbon dioxide, which has been extracted to the outside of the vehicle $V_e$ after the calculation in the routine of the previous step, is added to the current recovery amount of carbon dioxide. In other words, the amount of carbon dioxide, which has been recovered after the execution of the routine of the previous step, is obtained.

In addition, the recovery amount of carbon dioxide up to the routine of the previous step is also acquired (step S140). In other words, a previous value, which is the total recovery amount up to the routine of the previous step, is acquired. Since the previous value in step S140 is a value that needs to be acquired when there is a request for calculation in step S100, the previous value may be obtained concurrently with any one of, or during between, the above-described steps S110 to S130. Moreover, when the determination in step S120 is negative, that is, when it is determined that carbon dioxide is not being extracted to the outside of the vehicle $V_e$ after the calculation of the total recovery amount of carbon dioxide in the routine of the previous step, the process skips step S130 and proceeds to step S140.

Subsequently, the total recovery amount of carbon dioxide is calculated (step S150). In other words, the total recovery amount is calculated by adding the recovery amount of carbon dioxide calculated in step S130 to the recovery amount of carbon dioxide calculated in step S140. Then, the calculated total recovery amount is displayed on the HMI 21 (step S160).

Next, total mileage up to the current time is acquired (step S170). This is acquired for calculation of the recovery amount of carbon dioxide per unit kilometer (km) or a discharge amount of carbon dioxide per unit km. Similar to the total recovery amount, the total mileage refers to a traveled distance since the purchase of the vehicle $V_e$ by the owner, and uses data calculated by, for example, the mileage calculation unit 23. Then, the acquired total mileage is displayed on the HMI 21 (step S180).

Subsequently, a total recovery rate of carbon dioxide is calculated from the total recovery amount of carbon dioxide calculated in step S150 and the total mileage acquired in step S170 (step S190). In other words, a recovery amount (g) of carbon dioxide per unit km is calculated by dividing the total recovery amount of carbon dioxide by the total mileage. Then, the calculated total recovery rate is displayed on the HMI 21 (step S200).

In addition, the total discharge amount of carbon dioxide is also calculated for calculation of the discharge amount of carbon dioxide and the discharge rate of carbon dioxide per unit km (step S210). The total discharge amount of carbon dioxide can be calculated based on, for example, the amount of used fuel.

Subsequently, the total discharge rate of carbon dioxide is calculated from the calculated total discharge amount of carbon dioxide, and the total mileage acquired in step S170 (step S220). In other words, a discharge amount (g) of carbon dioxide per unit km is calculated by dividing the total discharge amount of carbon dioxide by the total mileage. Then, the calculated total discharge rate is displayed on the HMI 21 (step S230). The calculation of the data related to the discharge amount of carbon dioxide in steps S200 to S230 may be calculated in the same manner as, or in reverse order of, the calculation of the data related to the recovery amount of carbon dioxide.

Then, after the total recovery rate of carbon dioxide and the total discharge rate of carbon dioxide are respectively calculated as described above, an actual discharge rate, which is an actual discharge rate of carbon dioxide, is calculated (step S240). In other words, the actual discharge rate of carbon dioxide is calculated by subtracting the total recovery rate calculated in step S190 from the total discharge rate calculated in step S220. Then, the calculated actual discharge rate is displayed on the HMI 21 (step S250). In addition, each calculated value and its date and time are also recorded (step S260).

As such, the control example illustrated in FIG. 19 is configured to display the total recovery amount of carbon dioxide, and the like, on the HMI 21. FIG. 20 is a diagram illustrating an example of the display of the HMI 21. FIG. 20 illustrates the total recovery amount and total discharge amount of carbon dioxide, and the total mileage. As such, the occupant can recognize how much carbon dioxide is discharged and recovered from the vehicle $V_e$. Further, for example, by recognizing that the recovery amount of carbon dioxide has increased, the occupant can recognize that he/she is taking an action which contributes to environmental improvement or environmental conservation. As a result, it is possible to more actively promote the use of the vehicle $V_e$ on which the $CO_2$ recovery device 1 is mounted. Illustration of other items, such as the total recovery rate, total discharge rate, and actual discharge rate of carbon dioxide, will be omitted.

Next, still another control example in the embodiment of the present disclosure will be described. The embodiment of the above-described FIG. 19 is configured to calculate and digitize the total recovery amount of carbon dioxide, and the like, by adding the value calculated in the routine of the previous step to the value calculated in the current routine. Meanwhile, the recovery amount of carbon dioxide in a predetermined section is calculated from the value calculated in the routine of the previous step and the value calculated in the current routine. Then, the calculated recovery amount of carbon dioxide or the recovery rate in the predetermined section may be displayed on the HMI 21.

Figure 21:
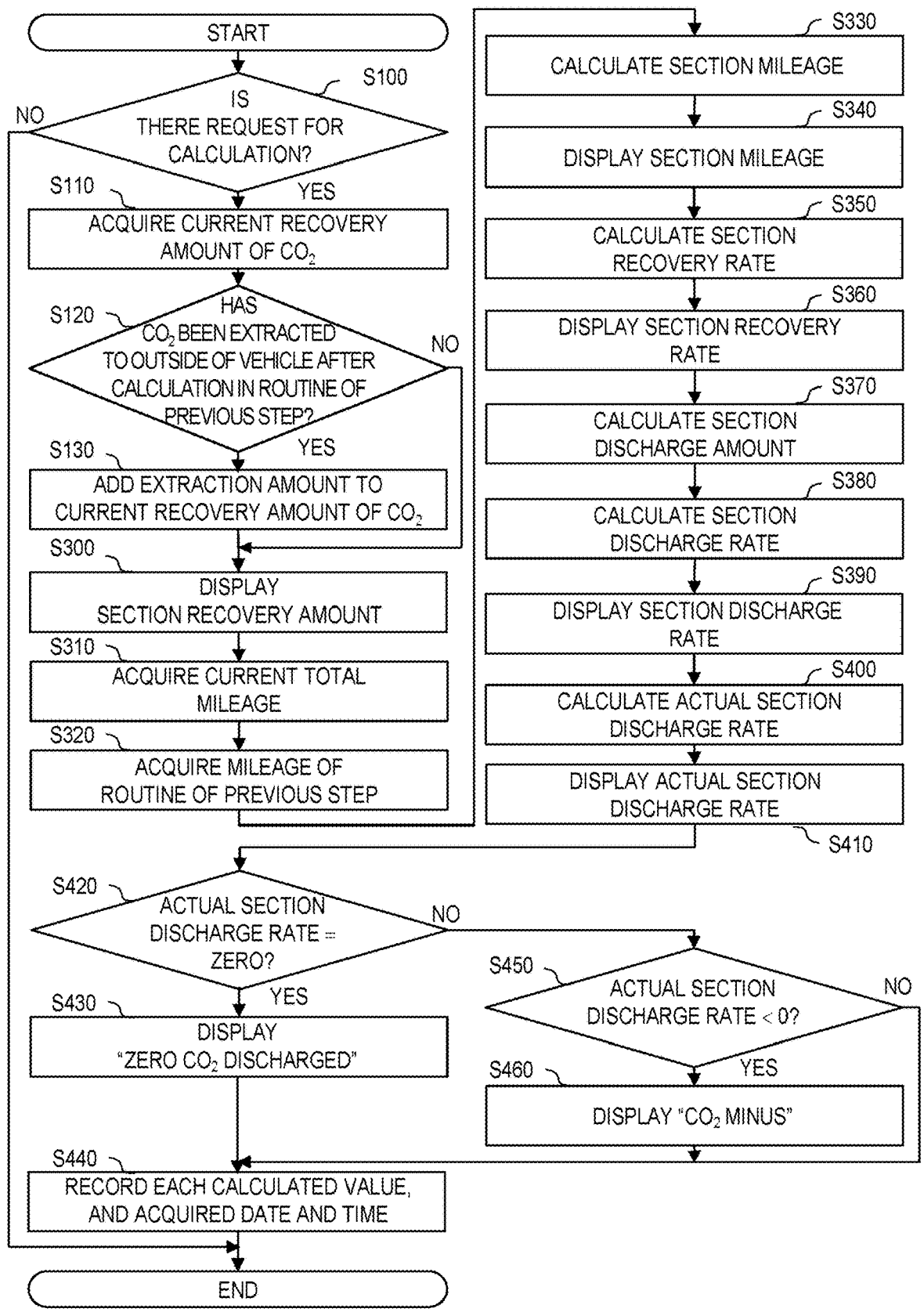
FIG. 21 is a flowchart describing an example of control for calculating a section recovery amount, section mileage, a section recovery rate, a section discharge amount, a section discharge rate, and a section actual discharge rate of carbon dioxide.

FIG. 21 is a flowchart illustrating an example of the control. The description of the same steps as those in the control example in FIG. 19 will be omitted or simplified, and the same step numbers are assigned. Specifically, first, it is determined whether there is a request for calculation of the recovery amount of carbon dioxide (step S100), and then the current recovery amount in the $CO_2$ recovery device 1 is acquired (step S110). When it is determined that carbon dioxide has been extracted to the outside of the vehicle $V_e$, such as the recovery stand 13, after the calculation of the recovery amount of carbon dioxide in the routine of the previous step, the amount of carbon dioxide extracted to the outside is added to the current recovery amount (step S130). In other words, the recovery amount in step S130 is the amount of increase from the recovery amount of carbon dioxide calculated in the routine of the previous step, and is the amount of increase in the recovery amount from the traveling point of the routine of the previous step, that is, a section recovery amount. Although not shown, it is also possible to obtain the section recovery amount by acquiring the amount of carbon dioxide recovered up to the routine of the previous step (the previous value) and subtracting the previous value from the amount of carbon dioxide recovered up to the current time. Then, the calculated section recovery amount is displayed on the HMI 21 (step S300).

Subsequently, for calculation of section mileage, the total mileage up to the current time is acquired (step S310), and the total mileage calculated in the routine of the previous step is acquired (step S320). Then, the section mileage is calculated by subtracting the total mileage calculated in the routine of the previous step from the acquired total mileage up to the current time (step S330). Thereafter, the calculated section mileage is displayed on the HMI 21 (step S340).

Next, a recovery rate of carbon dioxide in the section is calculated from the section recovery amount of carbon dioxide calculated in step S130 and the section travel distance calculated in step S330 (step S350). In other words, the recovery amount (g) of carbon dioxide per unit km is calculated by dividing the section recovery amount by the section mileage. Then, the calculated section recovery rate is displayed on the HMI 21 (step S360).

In addition, a section discharge amount of carbon dioxide, which is a discharge amount of carbon dioxide in the section, is also calculated (step S370). This can be calculated, for example, based on the amount of fuel used in the section. Then, the discharge rate of carbon dioxide in the section is calculated from the calculated section discharge amount and the section mileage calculated in step S330 (step S380). In other words, the discharge amount (g) of carbon dioxide per unit km is calculated by dividing the section discharge amount by the section mileage. Thereafter, the calculated section discharge rate is displayed on the HMI 21 (step S390).

Then, the section actual discharge rate, which is an actual discharge rate in the section, is calculated from the section recovery rate calculated in step S350 and the section discharge rate calculated in step S380 (step S400). In other words, the actual discharge rate of carbon dioxide in the section is calculated by subtracting the section recovery rate from the section discharge rate. Thereafter, the calculated actual discharge rate is displayed on the HMI 21 (step S410).

Further, it is determined whether the section actual discharge rate calculated in step S400 is "zero" (step S420). When the section actual discharge rate is "zero", "zero $CO_2$ discharged" is displayed (step S430), and each calculated value and its date and time are also recorded (step S440).

On the other hand, when the determination in step S420 is negative, that is, when it is determined that the section actual discharge rate is not "zero", it is determined whether the section actual discharge rate is a negative value (step S450). In other words, it is determined whether the section recovery rate is greater than the section discharge rate. This is a case in which, for example, in addition to the recovery of carbon dioxide contained in the exhaust gas, the carbon dioxide contained in the atmosphere or in the air inside the cabin of the vehicle $V_e$ is recovered to the $CO_2$ recovery device 1, and thus the recovery amount becomes greater than the discharge amount. In such a case, a determination in step S450 is affirmative, and in that case, "$CO_2$ minus" is displayed (step S460) and the process proceeds to step S440. Thereafter, each calculated value and its date and time are recorded, and the control example ends. On the contrary, when the determination in step S450 is negative, that is, when the actual discharge rate is not a negative value (in other words, when the discharge amount is greater than the recovery amount), the process proceeds to step S440, and the control example ends.

Figure 22:
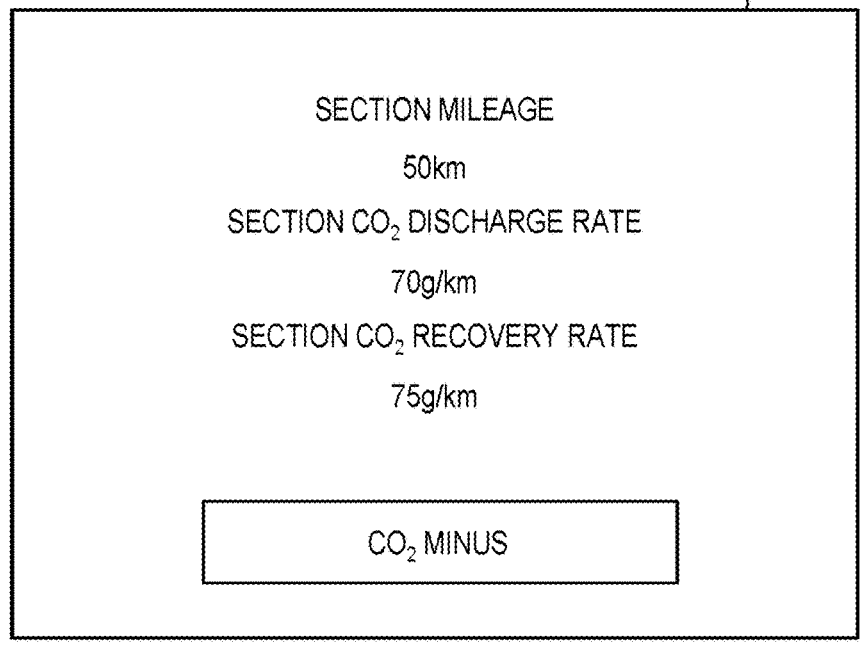
FIG. 22 is a diagram illustrating an example of an HMI display when the control example of FIG. 21 is executed.

As such, in the control example illustrated in FIG. 21, the section recovery amount of carbon dioxide, and the like, is displayed on the HMI 21. FIG. 22 is a diagram illustrating an example of a display of the HMI 21. FIG. 22 illustrates the section mileage, the section $CO_2$ recovery rate, the section $CO_2$ discharge rate, and the display of $CO_2$ minus. As such, the occupant can recognize how much carbon dioxide has been discharged and recovered in the predetermined section. Further, when the discharge amount and the recovery amount of carbon dioxide is the same, "zero $CO_2$ discharged" can be recognized, or when the recovery rate of carbon dioxide exceeds the discharge rate, "$CO_2$ minus" can be recognized, such that the occupant can recognize that he/she is taking an action which contributes to environmental improvement or environmental conservation. As a result, it is possible to more actively promote the use of the vehicle $V_e$ on which the $CO_2$ recovery device 1 is mounted. Illustration of a different section recovery amount, section discharge amount, actual discharge rate, and the like, will be omitted.

Figure 23:
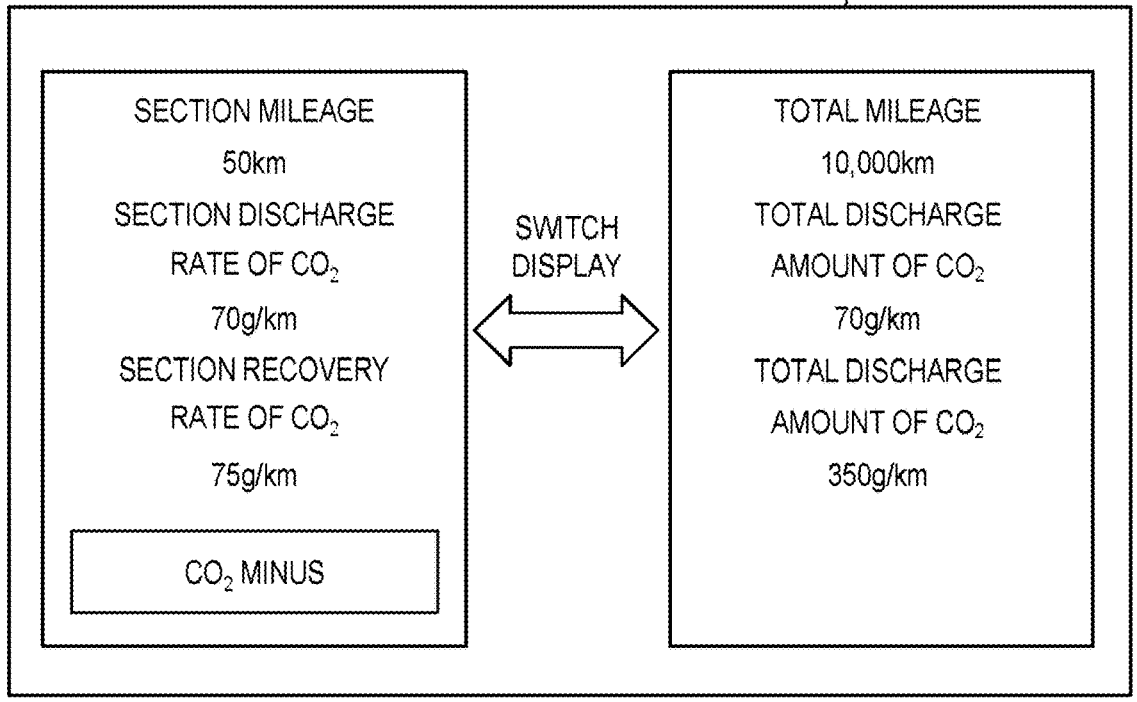
FIG. 23 is a diagram illustrating an example of an HMI display when the control examples of FIGS. 19 and 21 are executed.
Figure 24:
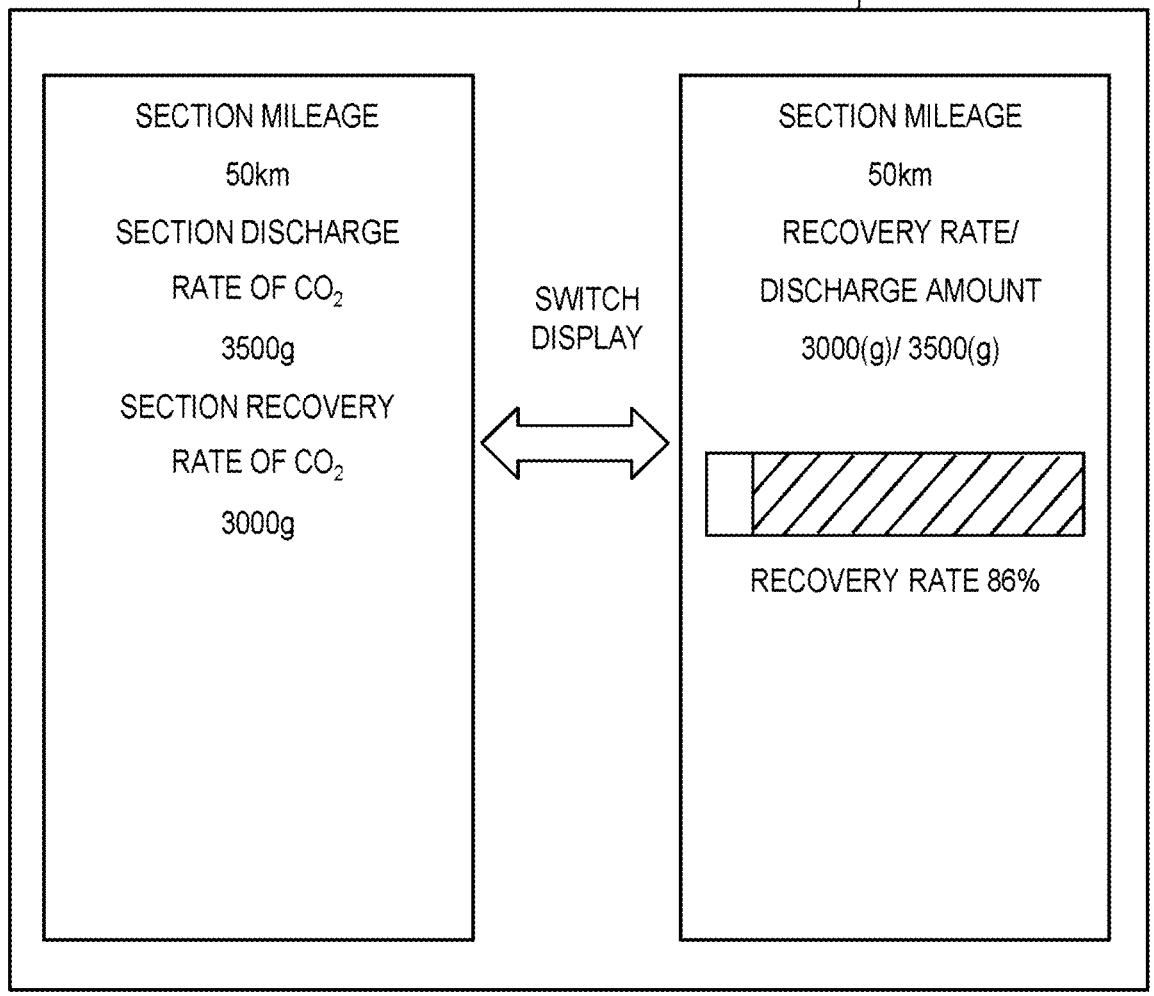
FIG. 24 is a diagram illustrating another example of the HMI display when the control example of FIG. 21 is executed.

Moreover, each calculated value in the total mileage calculated in the control example of FIG. 19 may be displayed in conjunction with each calculated value in the predetermined section calculated in the control example of FIG. 21. For example, in an example illustrated in FIG. 23, each calculated value in the total mileage and each calculated value in a predetermined section can be switched with each other and displayed. Further, for example, as illustrated in an example of FIG. 24, the recovery rate in the predetermined section can be switched to a graph and displayed. In other words, as long as the occupant can visually recognize the recovery state of carbon dioxide, the display method may be appropriately changed.

As described above, each embodiment of the present disclosure has been described, but the present disclosure is not limited to the above-described example, and may be appropriately modified within a range that achieves the object of the present disclosure. The gas containing carbon dioxide to be recovered as described above is not limited to the exhaust gas from the engine 2, but may include the air (the atmosphere) outside the vehicle $V_e$ or the air inside the cabin of the vehicle $V_e$. Therefore, the vehicle $V_e$ targeted by the present disclosure is not limited to a vehicle provided with the engine 2, or a hybrid vehicle provided with the engine 2 and a motor, and may include an electric vehicle only provided with the motor as a driving power source, a so-called range extender EV provided with the engine 2 for power generation, and a fuel cell vehicle on which a fuel cell is mounted as an energy source.

Further, in the control example described above, the total recovery amount or the total mileage are described as the recovery amount of carbon dioxide or the distance since the purchase of the vehicle $V_e$ by the owner, but may be a comprehensive recovery amount or distance in a predetermined period set in advance. Therefore, the total recovery amount or the total mileage may be a recovery amount or a distance since, for example, completion of vehicle inspection after the purchase of the vehicle $V_e$ by the owner. Further, the calculation may also be executed after, for example, a change in the ownership of a vehicle $V_e$.

Figure 25:
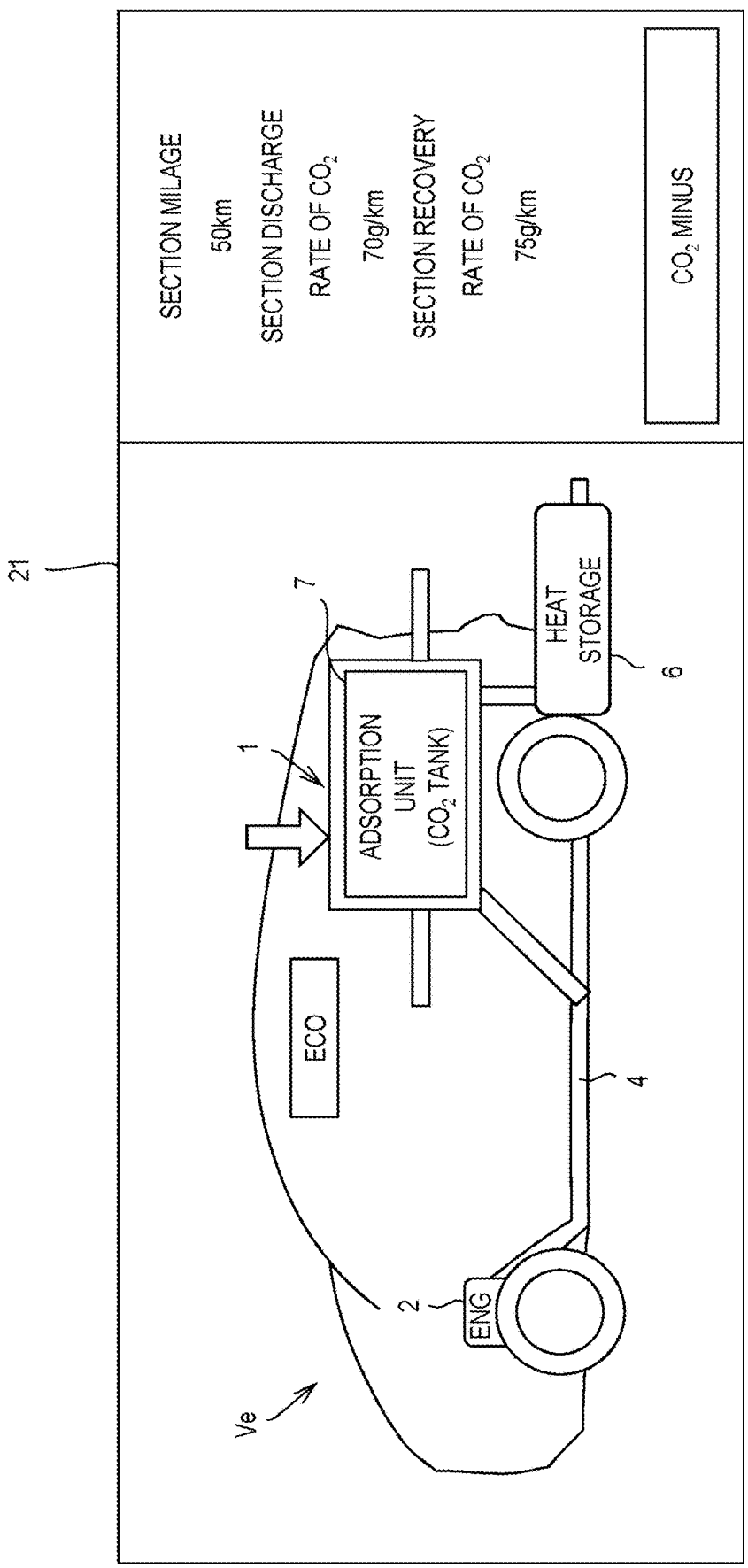
FIG. 25 is a diagram illustrating still another example of the HMI display when the control example of FIG. 21 is executed.

In addition, as described above, the display of the recovery state of carbon dioxide, and the like, is described by the display using the image of the vehicle $V_e$ or the display using the digitized image, but as illustrated in FIG. 25, the image of the vehicle $V_e$ indicating the recovery state of carbon dioxide and the digitized image may be displayed in conjunction with or in cooperation with each other. In the above-described example, although the adsorption unit 7 is described as a $CO_2$ tank that temporarily reserves the recovered carbon dioxide, a separate $CO_2$ tank can be provided.

What is claimed is:

1. A display device of a vehicle on which a $CO_2$ recovery device is mounted, the $CO_2$ recovery device through which gas circulates recovering carbon dioxide from the gas, the display device comprising:
    a controller configured to control the vehicle, the controller including
        a recovery state determination unit configured to determine a recovery amount or a recovery state of the carbon dioxide recovered by the $CO_2$ recovery device, and
        an image data creation unit configured to create image data corresponding to the recovery amount or the recovery state detected by the recovery state determination unit; and
    a display screen configured to receive the image data and display an image corresponding to the image data, wherein
    the image data and the image vary depending on the recovery amount or the recovery state, and
    the controller is configured to:
        determine whether the $CO_2$ recovery device is recovering the carbon dioxide;
        determine, when the $CO_2$ recovery device is recovering the carbon dioxide, which of an exhaust system of the vehicle, an atmosphere outside the vehicle, and an air inside a cabin of the vehicle is a source from which the carbon dioxide is recovered; and
        output, to the display screen, a display indicating a result of the determination as to which of the exhaust system of the vehicle, the atmosphere outside the vehicle, and the air inside the cabin of the vehicle is the source from which the carbon dioxide is recovered.

2. The display device according to claim 1, wherein:
    the $CO_2$ recovery device includes an adsorption unit configured to capture the carbon dioxide from the gas and adsorb the carbon dioxide; and
    the controller is configured to:
        determine whether an adsorption amount of the carbon dioxide adsorbed in the adsorption unit has reached a limit value; and
        output, to the display screen, when the adsorption amount has reached the limit value, a warning display from which a fact that the adsorption amount has reached the limit value is recognizable as an image data corresponding to the adsorption unit.

3. The display device according to claim 2, wherein the controller is configured to, when the adsorption amount has not reached the limit value:
    determine whether the adsorption amount is equal to or greater than a predetermined threshold value which is smaller than the limit value; and
    output, to the display screen, when the adsorption amount is equal to or greater than the predetermined threshold value, a second warning display having a degree of caution which is lower than that of the warning display.

4. The display device according to claim 1, wherein the controller is configured to:
output, to the display screen, when the source is the exhaust system, a display indicating that the carbon dioxide is being recovered from the exhaust system;
output, to the display screen, when the source is the atmosphere, a display indicating that the carbon dioxide is being recovered from the atmosphere; and
output, to the display screen, when the source is the air inside the cabin of the vehicle, a display indicating that the carbon dioxide is being recovered from the air.

5. The display device according to claim 4, wherein the controller is configured to:
determine, when the carbon dioxide has been recovered from the exhaust system, whether all of the carbon dioxide contained in the exhaust system has been recovered; and
output, to the display screen, when all of the carbon dioxide contained in the exhaust system has been recovered, a mark representing environmental conservation.

6. The display device according to claim 4, wherein the controller is configured to output, to the display screen, when the carbon dioxide has been recovered from the atmosphere or from the air, a mark representing environmental conservation.

7. The display device according to claim 4, wherein the controller is configured to:
determine, when the $CO_2$ recovery device is not recovering the carbon dioxide, whether the carbon dioxide is being extracted to recovery equipment provided outside the vehicle; and
output, to the display screen, when the carbon dioxide is being extracted to the recovery equipment, a display indicating that the carbon dioxide is being extracted.

8. The display device according to claim 7, wherein the controller is configured to:
determine whether the carbon dioxide is being extracted to the recovery equipment by using energy from the vehicle or energy from outside of the vehicle;
output, to the display screen, when the carbon dioxide is being extracted to the recovery equipment by using the energy from the vehicle, a display indicating that the energy from the vehicle is being supplied to the $CO_2$ recovery device; and
output, to the display screen, when the carbon dioxide is being extracted to the recovery equipment by using the energy from the outside of the vehicle, a display indicating that the energy from the outside of the vehicle is being supplied to the $CO_2$ recovery device.

9. The display device according to claim 7, wherein the controller is configured to output a mark representing environmental conservation to the display screen when the carbon dioxide has been extracted to the recovery equipment.

10. The display device according to claim 1, wherein the controller is configured to:
calculate a total mileage of the vehicle, which is a predetermined section, and a total recovery amount, which is an amount of carbon dioxide recovered while the vehicle travels the total mileage;
calculate a total recovery rate of the carbon dioxide, which is a rate of a recovery amount of the carbon dioxide to mileage, from the total mileage and the total recovery amount; and
output the total recovery rate to the display screen.

11. The display device according to claim 10, wherein the controller is configured to:
calculate a total discharge amount of carbon dioxide, which is an amount of the carbon dioxide discharged while the vehicle travels the total mileage;
calculate a total discharge rate of the carbon dioxide, which is a rate of a discharge amount of the carbon dioxide to the mileage, from the total discharge amount and the total mileage;
calculate an actual discharge rate of the carbon dioxide, which is an actual discharge rate of the carbon dioxide, from the total discharge rate and the total recovery rate; and
output the actual discharge rate to the display screen.

12. The display device according to claim 1, wherein the controller is configured to:
calculate a section mileage of the vehicle, which is mileage of a predetermined section, and a section recovery amount which is an amount of carbon dioxide recovered while the vehicle travels the section mileage;
calculate a section recovery rate of the carbon dioxide, which is a rate of a recovery amount of the carbon dioxide to mileage, from the section mileage and the section recovery amount; and
output the section recovery rate to the display screen.

13. The display device according to claim 12, wherein the controller is configured to:
calculate a section discharge amount of carbon dioxide, which is an amount of carbon dioxide discharged while the vehicle travels the section mileage;
calculate a section discharge rate of the carbon dioxide, which is a rate of a discharge amount of carbon dioxide to the mileage, from the section discharge amount and the section mileage;
calculate an actual section discharge rate, which is an actual discharge rate of the carbon dioxide in the section mileage, from the section recovery rate and the section discharge rate; and
output the actual section discharge rate to the display screen.

14. The display device according to claim 13, wherein the controller is configured to:
determine whether the actual section discharge rate is zero; and
output, to the display screen, when the actual section discharge rate is zero, a display indicating that a discharge amount of the carbon dioxide is zero.

15. The display device according to claim 14, wherein the controller is configured to:
determine, when the actual section discharge rate is not zero, whether the actual section discharge rate is minus; and
output, to the display screen, when the actual section discharge rate is minus, a display indicating that a discharge amount of the carbon dioxide is minus.

* * * * *